US012294121B2

(12) United States Patent
Chen et al.

(10) Patent No.: US 12,294,121 B2
(45) Date of Patent: May 6, 2025

(54) END COVER ASSEMBLY, HOUSING ASSEMBLY, BATTERY CELL, BATTERY, AND ELECTRIC EQUIPMENT

(71) Applicant: CONTEMPORARY AMPEREX TECHNOLOGY (HONG KONG) LIMITED, Hong Kong (CN)

(72) Inventors: Xinxiang Chen, Ningde (CN); Shoujun Huang, Ningde (CN); Yulian Zheng, Ningde (CN); Peng Wang, Ningde (CN); Wei Li, Ningde (CN); Chengdu Liang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 649 days.

(21) Appl. No.: 17/622,024

(22) PCT Filed: Sep. 7, 2020

(86) PCT No.: PCT/CN2020/113784
§ 371 (c)(1),
(2) Date: Dec. 22, 2021

(87) PCT Pub. No.: WO2022/047788
PCT Pub. Date: Mar. 10, 2022

(65) Prior Publication Data
US 2022/0367996 A1    Nov. 17, 2022

(51) Int. Cl.
*H01M 50/655*    (2021.01)
*H01M 50/103*    (2021.01)
(Continued)

(52) U.S. Cl.
CPC ....... *H01M 50/655* (2021.01); *H01M 50/103* (2021.01); *H01M 50/15* (2021.01);
(Continued)

(58) Field of Classification Search
CPC ......... H01M 2200/20; H01M 2220/20; H01M 50/655; H01M 50/186; H01M 50/209;
(Continued)

(56) References Cited

U.S. PATENT DOCUMENTS

2010/0294721 A1    11/2010    Frazier et al.
2013/0034757 A1    2/2013    Doyle
(Continued)

FOREIGN PATENT DOCUMENTS

CN    104064704 A  *  9/2014    .............. H01M 2/12
CN    206040730 U    3/2017
(Continued)

OTHER PUBLICATIONS

Chen et al., CN 109428018 A, EPO machine translation, 2019 (Year: 2019).*

(Continued)

*Primary Examiner* — Haroon S. Sheikh
*Assistant Examiner* — Kan Luo
(74) *Attorney, Agent, or Firm* — STERNE, KESSLER, GOLDSTEIN & FOX P.L.L.C.

(57) ABSTRACT

An end cover assembly includes: an end cover with a through hole for injecting electrolyte and a first clamping portion, wherein the first clamping portion is disposed along a circumferential direction of the through hole and is located on one side of the end cover away from an interior of the battery cell; a sealing ring for sealing the through hole; and a pressure relief device covering at least part of the sealing ring and closing the through hole; wherein the pressure relief device includes a second clamping portion, and is rotatable such that when the pressure relief device is rotated to a first position, the second clamping portion is clamped with the first clamping portion; and when the pressure relief device is (Continued)

rotated to a second position, the second clamping portion is disengaged from the first clamping portion.

16 Claims, 9 Drawing Sheets

(51) Int. Cl.
　　　*H01M 50/15*　　　(2021.01)
　　　*H01M 50/184*　　(2021.01)
　　　*H01M 50/186*　　(2021.01)
　　　*H01M 50/209*　　(2021.01)
　　　*H01M 50/308*　　(2021.01)
　　　*H01M 50/342*　　(2021.01)

(52) U.S. Cl.
　　　CPC ....... *H01M 50/184* (2021.01); *H01M 50/186* (2021.01); *H01M 50/209* (2021.01); *H01M 50/308* (2021.01); *H01M 50/3425* (2021.01); *H01M 2200/20* (2013.01); *H01M 2220/20* (2013.01)

(58) Field of Classification Search
　　　CPC ........... H01M 50/3425; H01M 50/184; H01M 50/103; H01M 50/15
　　　See application file for complete search history.

(56) References Cited

U.S. PATENT DOCUMENTS

| 2018/0097214 A1* | 4/2018 | Ogawa et al. | .......... H01M 2/12 |
| 2019/0203845 A1* | 7/2019 | Tomasko | ................ F16K 17/16 |

FOREIGN PATENT DOCUMENTS

| CN | 206332104 U | 7/2017 | |
| CN | 207183382 U | 4/2018 | |
| CN | 207353296 U | 5/2018 | |
| CN | 207896129 U | 9/2018 | |
| CN | 207993944 U | 10/2018 | |
| CN | 109428018 A * | 3/2019 | .............. H01M 2/08 |
| CN | 208970607 U | 6/2019 | |
| CN | 209071505 U | 7/2019 | |
| CN | 209472005 U | 10/2019 | |
| CN | 210136896 U | 3/2020 | |
| JP | 1973086923 U | 10/1973 | |
| JP | 1975033726 U | 4/1975 | |
| JP | 1998021893 A | 1/1998 | |
| JP | 2013-254660 A | 12/2013 | |
| JP | 2015050113 A | 3/2015 | |
| KR | 20170118797 A | 10/2017 | |
| WO | 2018177138 A1 | 10/2018 | |
| WO | WO 1999041798 A1 * | 8/2019 | ............ H01M 10/52 |

OTHER PUBLICATIONS

Yin et al., CN 104064704 A, EPO machine translation, 2014 (Year: 2014).*
Notice of First Review Opinion for Chinese Application No. 202080102826.2 issued by CNIPA, mailed on Jun. 15, 2024, 5 pages.
International Search Report issued in International Application No. PCT/CN2020/113784, mailed Jun. 15, 2021, 7 pages.
Supplementary European Search Report issued in European Application No. 20 94 0478, mailed Jul. 25, 2022, 15 pages.
Written Decision on Registration related to Korean Grant Application No. 10-2022-7030325, dated Mar. 13, 2025, 6 pages.

* cited by examiner

END COVER ASSEMBLY, HOUSING ASSEMBLY, BATTERY CELL, BATTERY, AND ELECTRIC EQUIPMENT

CROSS-REFERENCE TO RELATED APPLICATIONS

The present application is a national phase of International Application No. PCT/CN2020/113784 filed on Sep. 7, 2020, and entitled "END COVER ASSEMBLY, HOUSING ASSEMBLY, BATTERY CELL, BATTERY, AND ELECTRIC EQUIPMENT", the contents of which are incorporated by reference herein in its entirety.

TECHNICAL FIELD

The present application relates to the technical field of batteries, and in particular to an end cover assembly, a housing assembly, a battery cell, a battery, and an electric equipment.

BACKGROUND

As lithium ion battery cells and other battery cells have advantages such as a high energy density, a high power density, a large number of cycles, and a long storage time, lithium ion battery cells and other battery cells have been widely used in electric equipment such as electric vehicles.

Performances of the battery cell directly affects performances of the electric equipment. However, how to effectively improve the performances of the battery cell has always been a problem in the industry.

SUMMARY OF THE INVENTION

An object of the present application is to improve the performances of a battery cell.

According to a first aspect of the present application, an end cover assembly is provided, and the end cover assembly includes:

an end cover provided with a through hole for electrolyte injection and a first clamping portion, wherein the first clamping portion is disposed along a circumferential direction of the through hole and located on one side of the end cover away from an interior of the battery cell;

a sealing ring for sealing the through hole; and a pressure relief device covering at least part of the sealing ring and closing the through hole, wherein the pressure relief device is configured to be destroyed when an internal pressure of the battery cell reaches a threshold, so as to remove a closure of the through hole and release the internal pressure of the battery cell;

wherein the pressure relief device includes a second clamping portion and is rotatable, such that when the pressure relief device is rotated to a first position, the second clamping portion is clamped with the first clamping portion to limit separation of the pressure relief device from the end cover; and when the pressure relief device is rotated to a second position, the second clamping portion is disengaged from the first clamping portion to realize separation of the pressure relief device from the end cover.

As the pressure relief device and the end cover are rotatably clamped, and a clamping position is located on one side of the end cover away from the interior of the battery cell, metal chips generated when the pressure relief device is disassembled and assembled do not fall into the battery cell easily, such that the risk of a short circuit caused by the metal chips falling into the battery cell is reduced, thereby improving use safety of the battery cell.

In some embodiments, the pressure relief device includes a main body portion and a pressure relief member, the main body portion is connected to the second clamping portion, the pressure relief member closes the through hole, and the pressure relief member is configured to be destroyed when the internal pressure of the battery cell reaches the threshold to release the internal pressure.

In some embodiments, the pressure relief member and the main body portion are integrally or separately disposed. When being integrally disposed, the structure is simple, and the assembly is facilitated.

When being separately disposed, the main body portion and the pressure relief member are convenient to maintain separately, and meanwhile, it is also convenient to design different materials or structural compositions for the main body portion and the pressure relief member to meet different use requirements of the main body portion and the pressure relief member.

In some embodiments, the pressure relief member and the main body portion are disposed separately, and the pressure relief member is disposed between the main body portion and the sealing ring. In this case, compared with the case where the pressure relief member is disposed above the lower end surface of the main body portion and other positions instead of being disposed between the main body portion and the sealing ring, the pressure relief member is closer to an interior of the housing, and during pressure relief, gas can be more quickly impacted on the pressure relief member to break through the pressure relief member, thereby achieving a more efficient, reliable and safe pressure relief process.

In some embodiments, the pressure relief device further includes a separation ring, and the separation ring is disposed between the main body portion and the pressure relief member and is configured to separate the main body portion from the pressure relief member to protect the pressure relief member. The separation ring is supported between the main body portion and the pressure relief member to separate the main body portion from the pressure relief member, so that main body portion and the pressure relief member are no longer in direct contact. Therefore, abrasion of the pressure relief member during rotation of the main body portion is reduced or even eliminated, which further plays a role of protecting the pressure relief member.

In some embodiments, the separation ring is attached to the pressure relief member. In this way, the separation ring and the pressure relief member can be pre-assembled before being assembled on the end cover assembly, so as to improve the assembly efficiency of the battery cell.

In some embodiments, the pressure relief member includes a metal layer and a protective layer, the protective layer and the metal layer are disposed in a laminating manner, and an elongation rate of the protective layer is greater than an elongation rate of the metal layer. In this way, even when the metal layer is accidentally ruptured by force, the pressure relief member can still keep the through hole closed under the action of the protective layer, thereby reducing liquid leakage and gas leakage risk caused by the accidental force rupture of the metal layer, and effectively improving use reliability of the pressure relief member.

In some embodiments, the pressure relief device includes at least two pressure relief members connected to each other, and when the internal pressure of the battery cell reaches the threshold, an interconnected part of the at least two pressure relief members is broken through to release the internal pressure. Since a strength of the interconnected part of the pressure relief members is relatively low and forms a weak part of the pressure relief device, pressure relief requirements when the threshold is smaller are convenient to meet.

In some embodiments, the at least two pressure relief members are butted or partially overlap. When being butted, an interconnected part of the pressure relief members has a lower strength, thereby meeting the pressure relief requirements when the threshold is smaller. When being overlapped, a connection between the pressure relief members is more convenient to realize.

In some embodiments, the at least two pressure relief members partially overlap, and an overlapping part of the at least two pressure relief members protrudes to one side away from the sealing ring relative to remaining parts of the at least two pressure relief members, which is beneficial to keep a surface of the pressure relief device close to the sealing ring flat, so as to achieve more sufficient contact between the pressure relief device and the sealing ring.

In some embodiments, the overlapping part of the at least two pressure relief members is bent to reduce a height of the overlapping part. The reduction of the height of the overlapping part is beneficial to reduce a height of the end cover assembly, thereby improving a space utilization rate of the battery cell in a height direction, and increasing an energy density of the battery cell.

In some embodiments, a separation ring of the pressure relief device is provided with an accommodating slot, and the overlapping part of the at least two pressure relief members is accommodated in the accommodating slot. Based on this, an uneven stress between the main body portion and the pressure relief member due to the protrusion of the overlapping part is prevented.

In some embodiments, the at least two pressure relief members are connected by means of heat sealing. When the heat sealing is adopted for connection, the operation is convenient, and the strength of the interconnected part of the pressure relief members is lower than a pressure strength of other parts of the pressure relief members, thereby meeting explosion-proof requirements of the battery cell with a lower burst pressure.

In some embodiments, the pressure relief member is an aluminum plastic film. In this case, reliable closure of the through hole under normal conditions is achieved based on stronger electrolyte leakage preventing and waterproofing capabilities of the aluminum plastic film, and damage and leakage risk of the pressure relief member caused by accidental deformation is reduced based on a more excellent deformation resistance of the aluminum plastic film than a single metal sheet.

In some embodiments, the first clamping portion is one of a clamping slot and a clamping column, and the second clamping portion is the other of the clamping slot and the clamping column. When the clamping slot and the clamping column cooperates, the structure is simple.

In some embodiments, the end cover assembly further includes a guide slot, the guide slot is in communication with the clamping slot, such that during rotation of the pressure relief device, the clamping column enters and exits the clamping slot through the guide slot. In this way, under guidance of the guide slot, a smoother and more efficient rotary clamping process is realized.

In some embodiments, the pressure relief device is provided with a groove, and the sealing ring is located in the groove. In this way, space occupation of the sealing ring is reduced, which is beneficial to reduce an overall height of the battery cell and increase the energy density of the battery cell.

According to a second aspect of the present application, there is provided a housing assembly for a battery cell, which includes:

a housing, wherein the housing is configured to be connected to an end cover to form a shell of the battery cell, the housing is provided with a through hole and a first clamping portion, and the first clamping portion is disposed along a circumferential direction of the through hole and is located on one side of the housing away from an interior of the battery cell;

a sealing ring for sealing the through hole; and a pressure relief device covering at least part of the sealing ring, closing the through hole and configured to remove a closure of the through hole when an air pressure in the housing reaches a preset pressure;

wherein the pressure relief device includes a second clamping portion, and is rotatable such that when the pressure relief device is rotated to a first position, the second clamping portion is clamped the first clamping portion are connected in a clamping manner to limit the separation of the pressure relief device from the housing; and when the pressure relief device is rotated to a second position, the second clamping portion is disengaged from the first clamping portion to realize the separation of the pressure relief device from the housing.

A remaining area of the housing is relatively large, which is more convenient to dispose the through hole, the sealing ring and the pressure relief device.

According to a third aspect of the present application, there is provided a battery cell, including:

an electrode assembly and a shell for accommodating the electrode assembly, wherein the shell includes a housing and the end cover assembly in an embodiment of the present application, the housing has an end opening, and the end cover assembly covers the end opening of the housing; or, an electrode assembly and a shell for accommodating the electrode assembly, wherein the shell includes an end cover and the housing assembly in an embodiment of the present application, the housing has an end opening, and the end cover covers the end opening of the housing.

Based on the disposed end cover assembly and housing assembly, the performances of the battery cell are effectively improved.

According to a fourth aspect of the present application, there is provided a battery, including the battery cell in an embodiment of the present application. Since the performances of the battery cell are improved, the performances of the battery are improved.

According to a fifth aspect of the present application, there is provided an electric equipment, including the battery cell in an embodiment of the present application, wherein the battery cell is configured to provide electric energy. Since the performances of the battery cell are improved, the performances of the electric equipment are improved.

According to a sixth aspect of the present application, there is provided a liquid injection method for a battery cell, which includes:

injecting electrolyte into the battery cell through a through hole in a housing or an end cover of a shell of the battery cell;

arranging a pressure relief device in a second position on the housing or the end cover, so that the pressure relief device covers at least part of a sealing ring, and a second clamping portion of the pressure relief device is disengaged from a first clamping portion disposed along a circumferential direction of the through hole on the shell and located on one side of the shell away from an interior of the battery cell; and rotating the pressure relief device from the second position to a first position, so that the second clamping portion is clamped with the first clamping portion to limit separation of the pressure relief device from the housing or the end cover.

Compared with the traditional manner of sealing a liquid injection hole by laser welding, such a liquid injection method can not only omit welding and sealing procedures of the liquid injection hole, but also omit many other procedures such as subsequent cleaning of welding slag caused by the welding and drying of cleaning residual liquid. Therefore, the present application improves production efficiency of the battery cell.

In some embodiments, the liquid injection method further includes: before arranging the pressure relief device on the housing or the end cover, installing the sealing ring on the shell. By installing the sealing ring on the shell in advance, after installing the pressure relief device, the sealing ring is directly covered, or a pressing force is generated for the sealing ring, so as to achieve a better sealing effect for the through hole.

In some embodiments, the liquid injection method further includes:

rotating the pressure relief device from the first position to the second position to disengage the second clamping portion from the first clamping portion; and separating the pressure relief device from the housing or the end cover.

The pressure relief device is removed from the shell, which facilitates maintenance operations such as liquid injection, exhaust, or replacement of the pressure relief device.

According to a fifth aspect of the present application, there is provided a liquid injection device for a battery cell, which includes:

a liquid injection mechanism configured to inject electrolyte into a shell through a through hole disposed in the shell; and a first disassembly and assembly mechanism configured to rotate a pressure relief device from a second position to a first position when the pressure relief device is in the second position, so that a second clamping portion of the pressure relief device and a first clamping portion on the shell are changed from a disengaged state to a clamping state, so as to limit separation of the pressure relief device from a housing or an end cover of the shell.

The provided liquid injection device can flexibly and conveniently assist in the disassembly and assembly of the pressure relief device in maintenance processes of the battery cell, such as production, assembly and secondary liquid injection of the battery cell. The operation is simple. It is beneficial to improve the assembly efficiency of the battery cell and shorten the maintenance time required for the battery cell, so that the battery cell can be subjected to liquid replenishment in time when the performances decline, thereby ensuring the working performances of the battery cell.

BRIEF DESCRIPTION OF THE DRAWINGS

The accompanying drawings described here are used to provide a further understanding to the present application and form a part of the present application. The exemplary embodiments and descriptions of the present application are used to explain the present application, but not forming an improper limitation thereto. In the accompanying drawings.

DETAILED DESCRIPTION

Figure 1A:
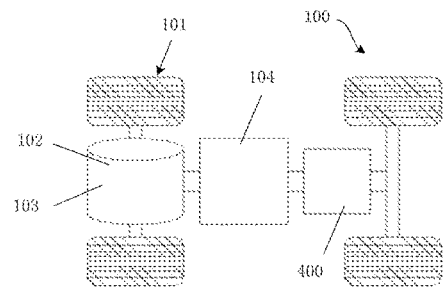
FIG. 1A is a schematic diagram of an electric equipment in some embodiments of the present application.

The present application will be described in detail below. In the following paragraphs, different aspects of the embodiments are defined in more detail. Each defined aspect can be combined with any other aspect or aspects, unless it is clearly indicated that they cannot be combined. In particular, any feature considered to be preferred or advantageous can be combined with one or more other features considered to be preferred or advantageous.

The terms "first", "second" and the like in the present application are only for the convenience of description, to distinguish different components with the same name, without indicating a sequence or a primary-secondary relationship.

In addition, when an element is described as being "on" another element, the element may be directly on the other element, or may be indirectly on the other element with one or more intermediate elements interposed therebetween. In addition, when an element is described as being "connected to" another element, the element may be directly connected to the other element, or may be indirectly connected to the other element with one or more intermediate elements interposed therebetween. In the following, the same reference signs denote the same elements.

There are many factors that affect performances of a battery cell. Over the years, those skilled in the art have tried to improve the performances of the battery cell by changing a structure of the battery cell from many different aspects. However, expected results have not been achieved.

A secondary battery cell such as a lithium ion battery cell mainly includes a shell, an electrode assembly, an connection member, electrolyte, and the like. The electrode assembly is disposed inside the shell, and is electrically connected to electrode terminals through the adaptor. The electrode terminals are disposed on the shell for electrical connection with an external circuit. The electrolyte is injected into a housing through a liquid injection hole, and is used for electrochemical reaction with active material on an electrode plate of the electrode assembly, so as to achieve a charge and discharge process.

In order to prevent the battery cell from exploding in the case that an internal pressure is too high, the battery cell also includes a pressure relief member. The pressure relief member is broken to realize pressure release when the internal pressure of the battery cell reaches a threshold, so as to play a safety protection role.

In the process of practicing the present application, inventors found that an arrangement mode of the pressure relief member and the liquid injection hole also affects the performances of the battery cell, including the performances such as an energy density and a service life of the battery cell.

In the related art known to the inventors, an exhaust channel corresponding to the pressure relief member and the liquid injection hole are separately disposed, which are both located on an end cover. The pressure relief member is fixed on the end cover by laser welding. The liquid injection hole is closed by a separate metal sealing member. After the electrolyte is injected, the metal sealing member is fixed by laser welding to close the liquid injection hole, thereby preventing the surrounding air and environment from being polluted by electrolyte leakage during use, or a short circuit of positive and negative electrodes since water vapor or metal particles enter the battery cell.

In the above arrangement mode, since the pressure relief member is fixed by welding, the pressure relief member can only be used once. Once the pressure relief member is damaged, it will cause an irreversible damage to the structure of the battery cell, resulting in scrapping of the entire battery cell and affecting the service life of the battery cell.

Meanwhile, in the above arrangement mode, since the liquid injection hole is sealed by welding, it is difficult to realize an electrolyte replenishment function during the use of the battery cell, and it is difficult to meet electrolyte replenishment requirements of the battery cell. After multiple charge and discharge cycles of the battery cell, the internal electrolyte will be inevitably subjected to irreversible consumption, resulting in a decreased use capacity of the battery cell and a shortened service life of the battery cell. If the electrolyte inside the battery cell can be replenished during the use of the battery cell, the decrease of the capacity of the battery cell can be effectively slowed down and the service life of the battery cell can be prolonged. However, when the liquid injection hole is sealed by welding, liquid injection can only be completed in a production stage, since if liquid replenishment is expected to be performed during use of the battery cell, a laser welding seam structure needs to be destroyed, which will cause the structure of the battery cell to be irreversibly damaged and the battery cell to be scrapped.

Moreover, in the above arrangement, as the liquid injection hole and the exhaust channel are separately disposed, more space is occupied, and the energy density of the battery cell is affected.

Based on the above findings, the present application improves the arrangement mode of the pressure relief member and the liquid injection hole, the pressure relief member is configured to be detachable, and meanwhile, the exhaust channel corresponding to the pressure relief member is used as the liquid injection to form a pressure relief-liquid injection integrated structure, thereby prolonging the service life of the battery cell, improving the energy density of the battery cell, and improving the performances of the battery cell.

In order to achieve the above object, the present application provides an end cover assembly, a housing assembly, a battery cell, a battery, an electric equipment, a liquid injection method, and a liquid injection device.

FIG. 1A to FIG. 27 show structures of the electric equipment, the battery, the battery cell, the end cover assembly, the housing assembly, and the liquid injection device and the process of a liquid injection method in some embodiments of the present application.

Figures 1B, 1C:
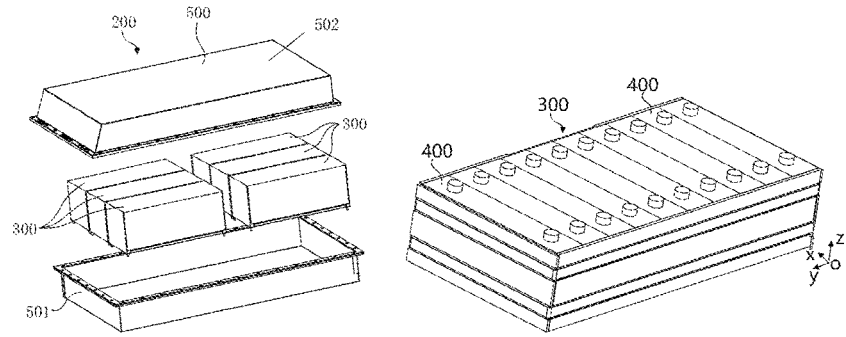
FIG. 1B is a schematic diagram of a battery in some embodiments of the present application.
FIG. 1C is a schematic diagram of a battery module in some embodiments of the present application.
Figure 1D:
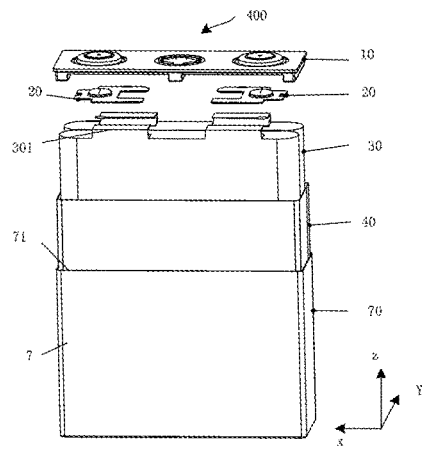
FIG. 1D is an exploded view of a battery cell in a first embodiment of the present application.

For convenience of description, firstly respective directions of the battery cell are defined based on a coordinate system in FIG. 1D, wherein x axis represents a length direction of the battery cell 400, Y axis is perpendicular to the x axis in the horizontal plane, and represents a width direction of the battery cell 400, and Z axis is perpendicular to a plane formed by the x axis and the y axis, and represents a height direction of the battery cell 400. Based on this orientation definition, an orientations or positional relationship is indicated by "upper", "lower", "top", "bottom", "front", "rear", "inner", "outer", and the like. However, it should be understood that such orientation definition is merely to facilitate description of the present application, rather than indicating or implying that the referred device must be located in a specific orientation or must be constructed and operated in a specific orientation, and therefore cannot be understood as a limitation to the protection scope of the present application.

Next, the present application will be described with reference to FIG. 1A to FIG. 27.

FIG. 1A shows a structure of an electric equipment 100 in some embodiments. Referring to FIG. 1A, the electric equipment 100 is a device that uses the battery cell 400 as an electrical source. The electric equipment 100 includes a battery cell 400, the battery cell 400 being used for providing electric energy.

The electric equipment 100 is a mobile device such as a vehicle 101, a ship or a small aircraft, and includes a power source. The power source includes the battery cell 400, which provides a driving force for the electric equipment 100. In some embodiments, the driving force of the electric equipment 100 is all electric energy. In this case, the power source only includes the battery cell 400. In some other embodiments, the driving force of the electric equipment 100 includes the electric energy and other energy sources (for example, mechanical energy). In this case, the power source includes the battery cell 400, and other power equipment such as an engine.

Taking the case where the electric equipment 100 is the vehicle 101 as an example. Referring to FIG. 1A, in some embodiments, the electric equipment 100 is a new energy vehicle such as a pure electric vehicle, a hybrid vehicle, or a range-extended vehicle, and the electric equipment 100 includes the battery cell 400, a controller 104, and a power apparatus 102 such as a motor 103. The battery cell 400 is electrically connected to the power apparatus 102 such as the motor 103 through the controller 104, so that the battery cell 400 can supply power to the power apparatus 102 such as the motor 103 under control of the controller 104.

In order to enable the battery cell to achieve higher power to meet higher use requirements, a battery 200 is disposed in the electric equipment 100. Referring to FIG. 1B and FIG. 1C, the battery 200 includes at least two battery cells 400, so that more electric energy is provided compared to the case where one single battery cell 400 is disposed.

As shown in FIG. 1B and FIG. 1C, in some embodiments, the battery 200 includes a box body 500 and a plurality of battery cells 400, and the plurality of battery cells 400 are disposed inside the box body 100. The plurality of battery cells 400 may also form a battery module 300, and then a plurality of battery modules 300 form the battery 200.

As shown in FIG. 1B, in some embodiments, the box body 500 includes a first box body 501 and a second box body 502. The first box body 501 and the second box body 502 are buckled with each other, so that a closed space is formed inside the box body 500 to accommodate the battery cells 400.

In combination with FIG. 1B and FIG. 1C, it can be seen that in some embodiments, the number of the battery cells 400 is multiple, the multiple battery cells 400 are disposed in groups, and each group of battery cells 400 is called the battery module 300. In other words, the battery 200 includes at least two battery modules 300, all the battery modules 300 are disposed in the box body 500, and each battery module 300 includes at least two battery cells 400. It should be noted that, FIG. 1B uses a simplified drawing method for the battery modules 300, and FIG. 1C uses a simplified drawing method for the battery cells 400 of the battery modules 300.

Respective battery cells 400 in the battery module 300 are electrically connected in series, parallel or hybrid, so as to achieve a larger capacity or a larger power. For example, referring to FIG. 1C, in some embodiments, the batteries 400 are placed upright, in this case, a height direction of the battery cells 400 is consistent with a vertical direction, and respective battery cells 400 in the battery module 300 are disposed side by side along a width direction of the battery cells 400. For another example, in some other embodiments, the battery cells 400 are placed flat, in this case, the width direction of the battery cells 400 is consistent with the vertical direction, and respective battery cells 400 in the battery module 300 are stacked into at least one layer along the width direction of the battery cells 400, and each layer includes at least two battery cells 400 disposed at intervals along a length direction.

As can be seen, in both the electric equipment 100 and the battery 200, the battery cell 400 is a core part, and performances of the battery cell 400 directly affect performances of the electric equipment 100 and the battery 200. When the service life of the battery cell 400 is prolonged and the performances are improved, it is beneficial to prolong the service lives of the electric equipment 100 and the battery 200 and improve the performances of the electric equipment 100 and the battery 200.

Next, the structure of the battery cell 400 will be introduced in combination with FIG. 1D to FIG. 24.

FIG. 1D shows an overall structure of the battery cell 400 in some embodiments. Referring to FIG. 1D, the battery cell 400 may be various types of battery cells such as a prismatic cell or a cylindrical cell, and the battery cell 400 includes a shell 70, an electrode assembly 30, a separating member 40, a connection member 20, and the like.

The shell 70 is configured to accommodate the electrode assembly 30 and the like to provide protection for the electrode assembly 30 and the like. The shell 70 includes a housing 7 and an end cover assembly 10. The housing 7 has an end opening 71. The end cover assembly 10 covers the end opening 71 of the housing 7, so that a sealed space for accommodating the electrode assembly 30 and the like is formed inside the shell 70.

The electrode assembly 30 is configured to generate electric energy, is disposed in the shell 70 and is formed by stacking or winding a first electrode plate, a second electrode plate, and an separator located between the first electrode plate and the second electrode plate. One of the first electrode plate and the second electrode plate is a positive electrode plate, while the other one is a negative electrode plate, and the first electrode plate and the second electrode plate both have a coating portion coated with an active material and a tab 301 without coating the active material and extending outward from the coating portion. The electric energy generated by the electrode assembly 30 is transmitted outward through the tab 301. The tab 301 corresponding to the positive electrode plate is called a positive tab, and the tab 301 corresponding to the negative electrode plate is called a negative tab. The positive tab extends from the coating portion of the positive electrode plate, and the negative tab extends from the coating portion of the negative electrode plate. In some cases, for example, in some prismatic cells, the positive tab and the negative tab are located at the same end of the electrode assembly 300. In some other cases, for example, in some cylindrical cells, the positive tab and the negative tab are located at opposite ends of the electrode assembly 300.

According to actual use requirements, the number of the electrode assemblies 30 in the battery cell 400 may be one, two, or more.

The separating member 40 is disposed in the shell 70, and located between the electrode assembly 30 and the housing 7 to insulate the electrode assembly 30 and the housing 7, so as to prevent a short circuit between the electrode assembly 30 and the housing 7.

The connection member 20 is disposed in the shell 70, and located between the electrode assembly 30 and the end cover assembly 10 to realize electrical connection between the electrode assembly 30 and an electrode terminal 10c of the end cover assembly 10. Specifically, in conjunction with FIG. 1D and FIG. 2, in some embodiments, the end cover assembly 10 includes two electrode terminals 10c, and the two electrode terminals 10c respectively correspond to the positive tab and the negative tab, and are called a positive electrode terminal and a negative electrode terminal respectively. In this case, the battery cell 400 includes two adaptors 20, and the two adaptors 20 correspond to the two electrode terminals 10c one to one, and are used to realize the electrical connection between the positive electrode terminal and the positive tab as well as the electrical connection between the negative electrode terminal and the negative tab respectively. As a variant, in some other embodiments, the end cover assembly 10 includes only one electrode terminal 10c, but the battery cell 400 includes two end cover assemblies 10, and the two end cover assemblies 10 are respectively disposed on two opposite sides of the electrode assembly 30.

FIG. 2 to FIG. 23 show more specific structures of the end cover assembly 10 in some embodiments. Next, the structure of the end cover assembly 10 will be further described in conjunction with FIG. 2 to FIG. 23.

Referring to FIG. 2-FIG. 23, in some embodiments, the end cover assembly 10 includes an end cover 10a, an insulating member 10d, a sealing ring 3, and a pressure relief device 10b.

The end cover 10a is configured to cover the end opening 71 of the housing 7, and provide an installation basis for other structural parts of the end cover assembly 10 such as the electrode terminal 10c and the pressure relief device 10b. The end cover 10a is provided with a through hole 11 for injecting the electrolyte. The through hole 11 penetrates two opposite side surfaces of the end cover 10a to enable the electrolyte to be injected into the battery cell 400 via the through hole 11. The shape of the through hole 11 is not limited, and for example, the through hole 11 is a round hole, an elliptical hole, a polygonal hole or a hole of other shapes.

The insulating member 10d is disposed between the end cover 10a and the electrode assembly 30, and is configured to achieve insulation between the end cover 10a and the electrode assembly 30.

The sealing ring 3 is disposed on the end cover 10a to seal the through hole 11, thereby preventing the electrolyte from leaking.

The pressure relief device 10b is disposed on the end cover 10a, and the pressure relief device 10b is configured to cover at least part of the sealing ring 3, as well as close the through hole 11. When an internal pressure of the battery cell 400 reaches a threshold, the pressure relief device 10b is destroyed to remove closure of the through hole 11, thereby releasing the internal pressure of the battery cell 400 to achieve an explosion-proof effect.

The threshold depends on materials of one or more of the positive electrode plate, the negative electrode plate, the electrolyte and the separator in the battery cell 400, and a specific size of the threshold is different according to different design requirements.

The pressure relief device 10b being destroyed means that the pressure relief device 10b generates an action or is activated to a certain state, for example, at least a part of the pressure relief device 10b is ruptured, broken, torn or opened, etc., so that the internal pressure and temperature of the battery cell 400 are released.

The pressure relief device 10b is in a structural form such as an vent, a gas valve, a pressure relief valve or a safety valve, and is specifically adopt a pressure-sensitive or temperature-sensitive element or structure, such that when the internal pressure or temperature of the battery cell 400 reaches a set threshold, the pressure relief device 10b performs an action, or a weak part of the pressure relief device 10b is destroyed, thereby forming an opening or a channel for releasing the internal pressure or temperature. After the pressure relief device 10b is destroyed, substances with high-temperature and high-pressure inside the battery cell 400 will be discharged outward from the destroyed part of the pressure relief device 10b as emissions, so that pressure relief and temperature reduction of the battery cell 400 is realized under controllable pressure or temperature, thereby avoiding potentially more serious accidents.

Based on the above arrangement, a pressure relief-liquid injection integrated structure is formed on the end cover assembly 10. The through hole 11 is served as both a liquid injection hole and an exhaust channel, thereby integrating functions of liquid injection and exhaust. In this case, there is no need to separately dispose the liquid injection hole and the exhaust channel, therefore, space occupation is effectively reduced, and the energy density of the battery cell 400 is increased. Meanwhile, the pressure relief device 10b is served as both an explosion-proof device and a liquid injection hole sealing member, thereby integrating functions of explosion-proof pressure relief and liquid injection sealing. Therefore, there is no need to separately dispose a metal sealing member for the liquid injection hole, which is beneficial to simplify the structure of the battery cell 400.

In order to facilitate the disassembly and assembly of the pressure relief device 10b and prolong the service life of the battery cell 400, in some embodiments, the pressure relief device 10b and the end cover 10a are configured to be rotatably clamped.

Referring to FIG. 2-FIG. 23, the end cover 10a is provided with a first clamping portion 24, and the first clamping portion 12 is disposed along a circumferential direction of the through hole 11. Meanwhile, the pressure relief device 10b is rotatable and includes a second clamping portion 42 cooperating with the first clamping portion 24. When the pressure relief device 10b is rotated to a first position, the second clamping portion 42 and the first clamping portion 24 are clamped to limit the pressure relief device 10b from being separated from the end cover 10a. When the pressure relief device 10b is rotated to a second position, the second clamping portion 42 is disengaged from the first clamping portion 24 to realize separation of the pressure relief device 10b and the end cover 10a. Specifically, in some embodiments, the pressure relief device 10b is rotated relative to the end cover 10*a* in a plane perpendicular to the height direction of the battery cell 400, and the rotation axis is an axis of the through hole 11.

Based on the above arrangement, only by controlling the pressure relief device 10*b* to rotate between the first position and the second position relative to the end cover 10*a*, combination or separation between the pressure relief device 10*b* and the end cover 10*a* is realized with engagement or disengagement between the first clamping portion 24 and the second clamping portion 42, so as to disassemble and assemble the pressure relief device 10*b*.

When the pressure relief device 10*b* is rotated to the first position relative to the end cover 10*a*, and the first clamping portion 24 is engaged with the second clamping portion 42, the pressure relief device 10*b* is combined with the end cover 10*a*, and the pressure relief device 10*b* is firmly installed on the end cover 10*a* to block the through hole 11, so as to prevent liquid and gas from leaking or prevent external impurities from entering the battery cell 400. In this case, due to a limitation of the end cover 10*a*, the pressure relief device 10*b* cannot move toward a direction away from the electrode assembly 30 relative to the end cover 10*a*, so that the pressure relief device 10*b* will not fall off from the end cover 10*a*. Moreover, in some embodiments, the pressure relief device 10*b* in the first position squeezes the sealing ring 3 to increase deformation of the sealing ring 3, so that a better sealing effect is achieved by the sealing ring 3. In some other embodiments, the pressure relief device 10*b* in the first position does not squeeze the sealing ring 3, but only contact with the sealing ring 3 to playing a role of limiting a displacement of the sealing ring 3 in the height direction.

When the pressure relief device 10*b* is rotated to the second position relative to the end cover 10*a*, and the first clamping portion 24 and the second clamping portion 42 are disengaged, the end cover 10*a* no longer limits the pressure relief device 10*b* from moving to one side away from the electrode assembly 30, and the pressure relief device 10*b* can be removed from the end cover 10*a*.

With removal of the pressure relief device 10*ba* replacement of the pressure relief device 10*b* that has been damaged or is difficult to hold to the threshold due to premature creep is facilitated, thereby the service life requirements of the pressure relief device 10*b* being reduced, and reliability of the pressure relief device 10*b* being improved, at the same time, a blocking of the through hole 11 by the pressure relief device 10*b* is removed, so that the through hole 11 communicates the inside and outside of the battery cell 400, in this case, on one hand, the electrolyte can be injected into the battery cell 400 through the through hole 11 to realize a secondary liquid injection function, so that during use of the battery cell 400, the electrolyte can be conveniently replenished or replaced for the battery cell 400 in time, so as to effectively slow down decrease of the capacity of the battery cell 400, and prolong the service life of the battery cell 400, and on the other hand, gas inside the battery cell 400 can be discharged through the through hole 11 to achieve an exhaust process.

The gas inside the battery cell 400 discharged through the through hole 11 may include gas generated during use of the battery cell 400. By discharging the gas generated during use of the battery cell 400, the internal pressure of the shell 70 is released, and the pressure relief device 10*b* is prevented from prematurely creeping due to a continuous action of the generated gas on the pressure relief device 10*b*, so as to avoid the liquid leakage or entrance of water and gas of the battery cell 400 caused by the premature creeping of the pressure relief device 10*b*, which is beneficial to prolong the service life of the pressure relief device 10*b*, and is further beneficial to prolong the service life of the battery cell 400. Meanwhile, by releasing the gas generated in the shell 70, an expansion action force of the battery cell 400 on other structures is reduced, and a structural damage to other structures due to an excessive expansion force of the battery cell 400 is avoided, which is beneficial to further improve the service lives of the battery 200 and the electric equipment 100 including the battery cell 400.

Based on the above arrangement, after the pressure relief device 10*b* is used for a period of time, the pressure relief device 10*b* can be detached to discharge the gas inside the battery cell 400, reducing the service life requirements on the pressure relief device 10*b*, and improving the use reliability of the pressure relief device 10*b*. In addition, after the pressure relief device 10*b* is detached, secondary electrolyte replenishment can be performed to improve the performances of the battery cell 400 and prolong the service life of the battery cell 400. Meanwhile, when the pressure relief device 10*b* is reinstalled, a new pressure relief device 10*b* can be replaced to further improve the use reliability of the battery cell 400 and prolong the service life of the battery cell 400.

As can be seen, with the above arrangement, a detachable arrangement of the pressure relief device 10*b* is realized, and the detaching is convenient and fast without irreversible damage to the battery cell 400, so that the battery cell 400 can be reused and the service life of the battery cell 400 is prolonged; what's more, in the process of disassembling and assembling the pressure relief device 10*b*, liquid injection and exhaust can be performed to improve the use reliability of the battery cell 400 and prolong the service life of the battery cell 400; in addition, an efficient use of a space of the end cover 10*a* is realized, the space occupied by the liquid injection hole disposed separately is saved, and the energy density of the battery cell 400 is increased; and meanwhile, since a flow area of a general exhaust channel is larger than an area of the liquid injection hole, the use of the through hole 11 for exhaust as the liquid injection hole at the same time is also beneficial to increase a liquid injection area, improve a liquid injection efficiency, accelerate a production cycle, and increase productivity.

Therefore, by setting the pressure relief device 10*b* as being rotatably clamped, and using the through hole 11 corresponding to the pressure relief device 10*b* for exhaust as the liquid injection hole at the same time, quick disassembly and assembly of the pressure relief device 10*b* under the premise of preventing the irreversible damage to the battery cell 400 is realized to facilitate liquid injection and exhaust, thus effectively improving the energy density of the battery cell 400, prolonging the service life of the battery cell 400, and improving the performances of the battery cell 400.

By setting the pressure relief device 10*b* to be detachable, the pressure relief device 10*b* is convenient to remove when in need, for example, when the pressure relief device 10*b* has been destroyed or when the pressure relief device 10*b* is not destroyed but has worked for a preset time, so as to replace the pressure relief device 10*b*, or perform maintenance operations of the battery cell such as liquid injection or exhaust. In addition, when the pressure relief device 10*b* is removed, the battery cell 400 will not be irreversibly damaged, so that the appearance of the battery cell 400 is kept consistent before and after removing, without affecting the use after liquid injection and exhaust. Meanwhile, after the liquid injection and exhaust are completed, the pressure relief device 10*b* can be easily installed on the end cover 10*a* to reliably close the through hole 11 again, thereby ensuring working reliability of the battery cell 400 after the liquid injection and exhaust. Moreover, the through hole 11 is closed by rotating the pressure relief device 10*b* directly, therefore, there is no need to seal the through hole 11 by laser welding, and a cleaning step of the through hole 11 before laser welding is reduced, which is beneficial to improve the production efficiency of the battery cell 400.

Although in order to realize the detachable arrangement of the pressure relief device 10*b*, the pressure relief device 10*b* may also be connected to the end cover 10*a* by threaded connection or other manners, when the rotary clamping manner is adopted, cooperating accuracy requirements on the pressure relief device 10*b* and the end cover 10*a* are lower, and the processing is convenient; meanwhile, the operation is more simple and convenient, which is beneficial to realize a more efficient disassembly and assembly process, improve the assembly efficiency of the battery cell 400 during production and shorten the maintenance time during use of the battery cell 400. In addition, unlike the threaded connection manner, the rotary clamping manner does not require a sufficient number of threads for connection. Therefore, compared with the threaded connection manner, the rotary clamping manner does not need to occupy too much height space, and has lower height requirements on the end cover assembly 10, which is beneficial to reduce the height of the battery cell 400, improve a height space utilization rate of the battery cell 400, and increase the energy density of the battery cell 400.

In addition, when the threaded connection manner is adopted, metal chips generated by friction during the screwing of a threaded member are likely to fall directly into the battery cell 400, causing an internal short circuit of the battery cell 400. While when the rotary clamping manner is adopted, the risk of short circuit caused by falling of the metal chips is reduced by setting a rotary clamping structure to reduce.

For example, referring to FIG. 2 to FIG. 23, in some embodiments, the first clamping portion 24 is located on one side of the end cover 10*a* away from the interior of the battery cell 400 (that is, one side away from the housing 7, i.e., one side away from the electrode assembly 30). In other words, the first clamping portion 24 is not directly disposed on the surface of the end cover 10*a* facing the interior of the battery cell 400 (also the surface of the end cover 10*a* close to the electrode assembly 30), but disposed at a preset distance from the surface of the end cover 10*a* facing the interior of the battery cell 400. The "preset distance" here is not specifically limited. For example, the first clamping portion 24 may be disposed in an upper, middle, or lower region of the end cover 10*a*, so that at least part of the end cover 10*a* is located between the first clamping portion 24 and the electrode assembly 30.

During rotation of the pressure relief device 10*b*, friction may occur between the first clamping portion 24 and the second clamping portion 42, resulting in the metal particles. By disposing the first clamping portion 24 on one side of the end cover 10*a* away from the interior of the battery cell 400, it is beneficial to prevent the short circuit of the battery cell 400 caused by the fact that the metal particles generated during rotation directly fall into the housing 7, thereby effectively improving working safety of the battery cell 400.

Referring to FIG. 2 to FIG. 4C, in some embodiments, in the height direction, the first clamping portion 24 is not lower than a position of the sealing ring 3, in this way, a rotary clamping position is not lower than a position of a sealing surface, and the metal chips generated during the rotating friction can be blocked by the sealing ring 3, and thus cannot fall into the housing 7, moreover, the metal chips can be conveniently cleaned after the pressure relief device 10*b* is removed, which can more reliably prevent the metal chips from falling. Meanwhile, when the rotary clamping position is not lower than the position of the sealing surface, it is also convenient for the pressure relief device 10*b* to apply force to the sealing ring 3 during rotation, thereby increasing the deformation of the sealing ring 3 and improving a sealing effect of the sealing ring 3.

Figure 4A:
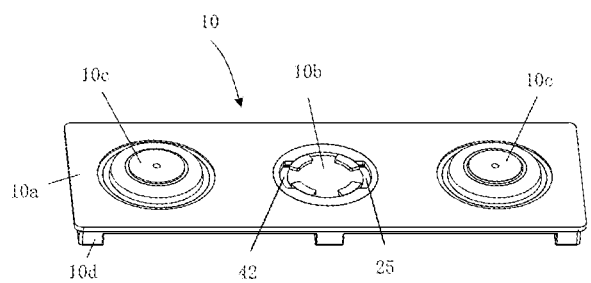
FIG. 4A is a perspective view of the end cover assembly shown in FIG. 2 when the pressure relief device is in a second position.
Figure 4B:
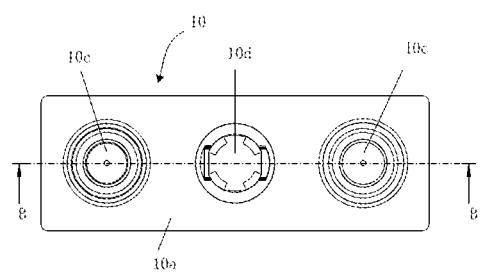
FIG. 4B is a top view of FIG. 4A.
Figure 4C:
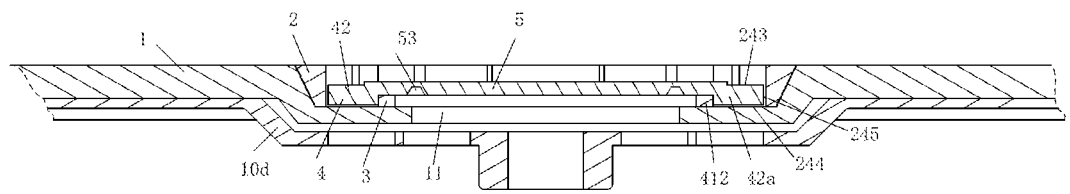
FIG. 4C is a partial cross-sectional view of FIG. 4B at B-B.

In addition, referring to FIG. 4C, in some embodiments, the pressure relief device 10*b* is provided with a groove 412, and the sealing ring 3 is located in the groove 412. In this way, a height occupancy of the sealing ring 3 is reduced, thereby an overall height of the end cover assembly 10 being reduced, and the energy density of the battery cell 400 being increased.

Next, a structural composition of the pressure relief device 10*b* will be further illustrated.

Referring to FIG. 2 to FIG. 23, in some embodiments, the pressure relief device 10*b* includes a main body portion 4 and a pressure relief member 5. The main body portion 4 is connected to the second clamping portion 42, and the pressure relief member 5 closes the through hole 11 and is destroyed when the internal pressure of the battery cell 400 reaches the threshold, so as to release the internal pressure. In this way, the main body portion 4 can be used to drive the second clamping portion 42 to rotate to realize the rotary clamping function, and the pressure relief member 5 can be used to realize the pressure relief function.

Referring to FIG. 2 to FIG. 7C and FIG. 20 to FIG. 23, the main body portion 4 and the pressure relief member 5 may be integrally disposed to simplify the structure and facilitate assembly. Or, referring to FIG. 8 to FIG. 19, the main body portion 4 and the pressure relief member 5 may also be disposed separately, so that the main body portion 4 and the pressure relief member 5 are convenient to maintain separately, for example, when the pressure relief member 5 is damaged and the main body portion 4 is not damaged, only the pressure relief member 5 can be replaced, thereby saving a maintenance cost, meanwhile, it is also convenient to design different materials or structural compositions for the main body portion 4 and the pressure relief member 5 to meet different use requirements of the main body portion 4 and the pressure relief member 5, for example, a thickness of the pressure relief member 5 can be flexibly changed to adjust a pressure resistance of the pressure relief member 5, thereby achieving blasting pressure relief under different thresholds.

When the main body portion 4 and the pressure relief member 5 are separately disposed, referring to FIG. 8 to FIG. 19, the pressure relief member 5 may be disposed between the main body portion 4 and the sealing ring 3. In this case, compared with the case where the pressure relief member 5 is disposed at other positions such as over a lower end surface of the main body portion 4 instead of being disposed between the main body portion 4 and the sealing ring 3, the pressure relief member 5 is closer to an interior of the housing 7, and during pressure relief, the gas can be more quickly impacted on the pressure relief member 5 to break through the pressure relief member 5, thereby achieving a more efficient, reliable and safe pressure relief process. In addition, the pressure relief member 5 located between the main body portion 4 and the sealing ring 3 can cover the sealing ring 3, and the pressure relief member 5 can be configured to have a larger cross-sectional area than the main body portion 4, therefore, when the pressure relief device 10*b* covers the sealing ring 3 through the pressure relief member 5 instead of the main body portion 4, it is beneficial to achieve more sufficient contact between the pressure relief device 10*b* and the sealing ring 3, thereby the sealing ring 3 being squeezed and/or restricted more reliably.

Continuing to refer to FIG. 8 to FIG. 19, when the pressure relief member 5 is located between the main body portion 4 and the sealing ring 3, in some embodiments, the pressure relief device 10*b* further includes a separation ring 6, and the separation ring 6 is disposed between the main body portion 4 and the pressure relief member 5 and is configured to separate the main body portion 4 from the pressure relief member 5, so as to protect the pressure relief member 5.

The separation ring 6 is supported between the main body portion 4 and the pressure relief member 5 to separate the main body portion 4 from the pressure relief member 5, so that the main body portion 4 and the pressure relief member 5 are no longer in direct contact. Therefore, abrasion of the pressure relief member 5 during rotation of the main body portion 4 can be reduced or even eliminated, thereby playing a role of protecting the pressure relief member 5. Meanwhile, a middle part of the separation ring 6 is hollowed out, which will not cause the blocking of the liquid injection channel and the exhaust channel, therefore, it is convenient for a smooth implementation of the liquid injection process and the exhaust process.

The separation ring 6 may be attached to the pressure relief member 5. For example, the separation ring 6 is adhered to the pressure relief member 5 or connected to the pressure relief member 5 by a connector. In this way, the separation ring 6 and the pressure relief member 5 can be pre-assembled before being assembled on the end cover assembly 10*a*, such that an assembly efficiency of the battery cell 400 is improved.

There may be multiples structures of the pressure relief member 5.

As one of the structures, the pressure relief member 5 is a single-layer member. For example, referring to FIG. 2 to FIG. 7C, FIG. 8 to FIG. 10A, and FIG. 20 to FIG. 23, in some embodiments, the pressure relief member 5 only includes a metal layer 51. In this case, the structure of the pressure relief member 5 is relatively simple.

As another of the structures, the pressure relief member 5 have a two-layer or multi-layer structure. For example, referring to FIG. 10B, FIG. 10C, FIG. 17 and FIG. 19, in some embodiments, the pressure relief member 5 includes the metal layer 51 and a protective layer 52*a*. The protective layer 52*a* and the metal layer 51 are disposed in a laminating manner, and an elongation rate of the protective layer 52*a* is greater than an elongation rate of the metal layer 51. In this way, even when the metal layer 51 is accidentally ruptured by force, the pressure relief member 5 can still keep the through hole 11 closed under the action of the protective layer 52*a*, thereby reducing the risk of liquid leakage and gas leakage caused by accidental force rupture of the metal layer 51, and effectively improving use reliability of the pressure relief member 5.

Specifically, the protective layer 52*a* has a single-layer structure, and is disposed on one side of the metal layer 51 close to the electrode assembly 30, or on one side of the metal layer 51 away from the electrode assembly 30. Alternatively, the protective layer 52*a* have a two-layer or multi-layer structure to protect the metal layer 51 more sufficiently. For example, referring to FIG. 10B and FIG. 10C, in some embodiments, the protective layer 52*a* includes a first protective layer 521 and a second protective layer 522. The first protective layer 521 is disposed on one side of the metal layer 51 away from the electrode assembly 30. The second protective layer 522 is disposed on one side of the metal layer 51 close to the electrode assembly 30. In this case, the metal layer 51 is sandwiched between the first protective layer 521 and the second protective layer 522, and the metal layer 51 is located inside the protective layer 52*a*. In this way, the protective layer 52*a* performs double-layer protection on the metal layer 51 on both sides of the metal layer 51 along the thickness direction, which achieves a better protective effect and can more reliably reduce the risk of accidental liquid leakage and gas leakage.

As a specific embodiment of the multi-layer pressure relief member 5, the pressure relief member 5 is an aluminum plastic film 52. The aluminum plastic film 52 is a multi-layer film structure, and generally includes an outer barrier layer, a barrier layer, and a high barrier layer which are disposed in sequence from outside to inside. The respective layers may be adhered together. The outer barrier layer, which is also called a base layer, is mainly made of nylon or PET (polyethylene terephthalate), and can protect the barrier layer from being scratched. The barrier layer is generally an aluminum layer, and plays roles such as shaping and waterproofing. The high barrier layer which is also called an electrolyte-resistant layer is mainly made of polypropylene. Due to multiple advantages such as a higher barrier property, a higher insulation property and a higher electrolyte resistance, in the related art, the aluminum plastic film 52 is generally used as one of core materials for packaging of a soft-pack battery cell to protect the internal electrode assembly 30. However, in the present application, the aluminum plastic film 52 is used as the pressure relief member 5 by breaking the conventional use mode of the aluminum plastic film 52, and specifically, the outer barrier layer, the barrier layer and the high barrier layer of the aluminum plastic film 52 are used as the aforementioned first protective layer 521, metal layer 522, and second protective layer 523 respectively, thus not only reliable closure of the through hole 11 under normal conditions is achieved with the stronger electrolyte leakage preventing and waterproofing capabilities of the aluminum plastic film 52, but also a risk of rupture and leakage caused by accidental deformation of the pressure relief member 5 is further reduced with a more excellent deformation resistance of the aluminum plastic film 52 than a single metal sheet.

In addition, the number of the pressure relief members 5 is not limited, and may be one, two or more. When the pressure relief device 10 includes at least two pressure relief members 5, referring to FIG. 11 to FIG. 19, the at least two pressure relief members 5 are connected to each other, and when the internal pressure of the battery cell 400 reaches the threshold, an interconnected part of the at least two pressure relief members 5 is broken through to release the internal pressure. In this case, a strength of the interconnected part of the pressure relief members 5 is lower, thus forming a weak part of the pressure relief device 10*b*, so that it is convenient to meet the pressure relief requirements when the threshold is smaller.

Figure 19:
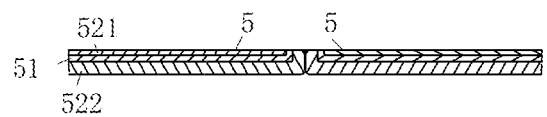
FIG. 19 is a second variant embodiment of the pressure relief member shown in FIG. 17.
Figure 20:
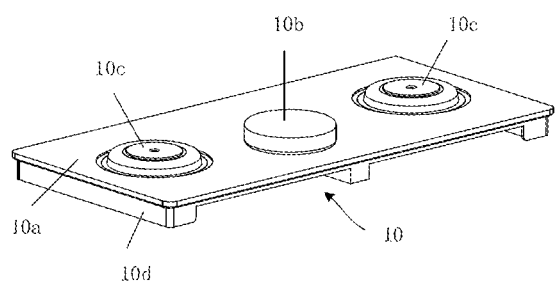
FIG. 20 is a perspective view of an end cover assembly in a fourth embodiment of the present application.

Referring to FIG. 19, in some embodiments, the aforementioned at least two pressure relief members 5 are butted, that is, connected without overlapping. In this case, the interconnected part of the pressure relief members 5 have a lower strength, so as to meet the pressure relief requirements when the threshold is smaller.

Figure 17:
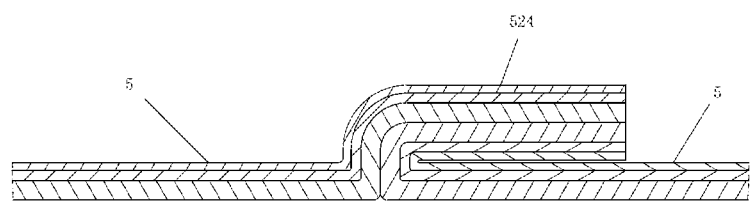
FIG. 17 is a partial enlarged view of I in FIG. 16.
Figure 18:
FIG. 18 is a first variant embodiment of the pressure relief member shown in FIG. 17.

Alternatively, referring to FIG. 17 and FIG. 18, in some other embodiments, the aforementioned at least two pressure relief members 5 are partially overlapped. In this case, it is more convenient to realize the connection between the pressure relief members 5.

Continuing to refer to FIG. 17 and FIG. 18, in some embodiments, when at least two pressure relief members 5 are partially overlapped, an overlapping part 524 of the at least two pressure relief members 5 protrudes to one side away from the sealing ring 3 relative to remaining parts of the at least two pressure relief members 5, thus it is beneficial to keep the surface of the pressure relief device 10b close to the sealing ring 3 flat, so that the pressure relief device 10b and the sealing ring 3 are more fully contacted.

Referring to FIG. 17, in some embodiments, the overlapping part 524 is bent, specifically, the overlapping part 524 is bent toward one side close to the sealing ring 3. In this way, a height of the overlapping part 524 is reduced. The reduction of the height of the overlapping part 524 is beneficial to reduce a height of the end cover assembly 10, improve a space utilization rate of the battery cell 400 in the height direction, and increase the energy density of the battery cell 400.

Figures 12, 13:
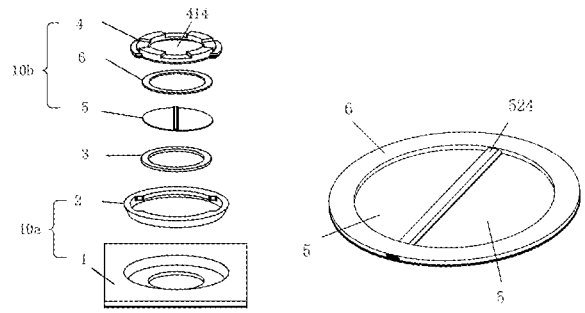
FIG. 12 is an exploded view of the end cover assembly shown in FIG. 11.
FIG. 13 is a combined view of the pressure relief member and a separation ring in FIG. 12.
Figures 14, 15:
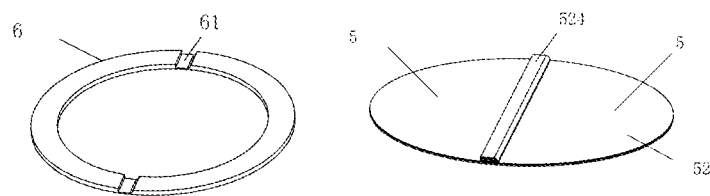
FIG. 14 is a perspective view of the separation ring in FIG. 13.
FIG. 15 is a perspective view of the pressure relief member in FIG. 13.

In addition, in the case where the pressure relief device 10b includes the separation ring 6, referring to FIG. 13 to FIG. 15, in some embodiments, the separation ring 6 is provided with an accommodating slot 61, and the overlapping part 524 is accommodated in the accommodating slot 61. Based on this, an uneven stress between the main body portion 4 and the pressure relief member 5 due to the protrusion of the overlapping part 524 is prevented.

In the foregoing respective embodiments, various connection modes such as adhering or heat sealing connection may be adopted between the pressure relief members 5. When the heat sealing connection mode is used, the operation is convenient, and the strength of the interconnected part of the pressure relief members 5 is lower than a pressure resistance strength of other parts of the pressure relief members, so as to meet explosion-proof requirements of the battery cell with a lower burst pressure.

In addition, on the basis of the foregoing respective embodiments, a notch 53 is further disposed on the pressure relief member 5. The notch 53 serves as a weakened region of the pressure relief member 5, so that when the internal pressure of the battery cell 400 reaches the threshold, the pressure relief member 5 is destroyed at the notch 53 firstly, which reduces destroy difficulty of the pressure relief member 5, realizes directional exhaust and pressure relief of the battery cell 400, and further improves use safety of the battery cell 400.

The notch 53 is a slot of various shapes such as a cross-shaped slot 532 or an annular slot 531. Moreover, when the notch 53 is the annular slot 531, the annular slot 531 is a full-circle annular slot or a non-full-circle annular slot. For example, in some embodiments, the annular slot 531 is a ¾-circle annular slot, so that when being broken through, the notch 53 will not be completely separated from the remaining part of the pressure relief member 5, but is still kept in a connection relationship with the remaining part of the pressure relief member 5, thereby preventing other damages caused by direct flying out of the notch 53, and improving the safety of a pressure relief process.

In addition, referring to FIG. 4C, in some embodiments, the notch 53 is located on a radial inner side of an inner ring of the sealing ring 3, in other words, in a radial direction of the sealing ring 3, an outer edge of the notch 53 is located on the inner side of the inner ring of the sealing ring 3, and the outer edge of the notch 53 does not exceed the inner ring of the sealing ring 3. In this case, the notch 53 will not be affected by a rebound force of the sealing ring 3. Therefore, the notch 53 is prevented from being accidentally ruptured due to the rebound force of the sealing ring 3, which is beneficial to improve use reliability of the pressure relief member 5 and prolong a service life of the pressure relief member 5.

Next, the rotary clamping structure between the pressure relief device 10b and the end cover 10a will be further introduced.

As mentioned above, the rotary clamping between the pressure relief device 10b and the end cover 10a is realized based on cooperation of the first clamping portion 24 on the end cover 10a and the second clamping portion 42 on the pressure relief device 10b, wherein when one of the first clamping portion 24 and the second clamping portion 42 is a clamping slot 24a, the other is a clamping column 42a. In other words, when the first clamping portion 24 is one of the clamping slot 24a and the clamping column 42a, the second clamping portion 42 is the other of the clamping slot 24a and the clamping column 42a. For example, referring to FIG. 2 to FIG. 23, in some embodiments, the first clamping portion 24 is the clamping slot 24a, and the second clamping portion 42 is the clamping column 42a. In this case, it is more convenient to process the clamping slot 24a and the clamping column 42a.

Further, referring to FIG. 2 to FIG. 23, in some embodiments, the end cover assembly 10 includes a guide slot 25, and the guide slot 25 is in communication with the clamping slot 24a. During rotation of the pressure relief device 10b, the clamping column 42a enters and exits the clamping slot 24a through the guide slot 25. In this way, on one hand, the guide slot 25 can avoid the pressure relief device 10b in the second position so as to prevent the pressure relief device 10b from interfering with the end cover 10a in the second position, and on the other hand, the guide slot 25 can also guide the clamping column 42a to enter and exit the clamping slot 24a more smoothly during rotation of the pressure relief device 10b, so as to achieve a smoother and more efficient rotary clamping process.

In order to facilitate the arrangement of the first clamping portion 24 on the end cover 10a, referring to FIG. 2 to FIG. 23, in some embodiments, the end cover 10a not only includes the end cover body 1, but also includes an installation component 2. The end cover body 1 is configured to cover the end opening 71 of the housing 7. The installation component 2 is disposed on the end cover body 1, and specifically located on one side of the end cover body 1 away from the electrode assembly 30 with a gap between the installation component 2 and the surface of the end cover body 1 facing the electrode assembly 30. The through hole 11 penetrates the installation component 2 and the end cover body 1 in turn, and includes a first hole section 111 on the end cover body 1 and a second hole section 26 on the installation component 2. The first hole section 111 and the second hole section 26 are arranged in sequence along a direction from the inside to the outside of the battery cell 400, and are in communication with each other, so that when the electrolyte is injected, the electrolyte flows through the second hole section 26 and the first hole section 111 in sequence, then enters the housing 7. The first clamping portion 24 is disposed on the installation component 2, or the first clamping portion 24 is formed by enclosing the installation component 2 and the end cover body 1.

A thickness of the end cover body 1 is generally small, and it is difficult to directly process the first clamping portion 24 on the end cover body 1. The installation component 2 connected to the end cover body 1 is further disposed, and the first clamping portion 24 is disposed on the installation component 2, or the first clamping portion 24 is disposed between the installation component 2 and the end cover body 1, such that processing difficulty of the first clamping portion 24 is effectively reduced, and arrangement of the first clamping portion 24 on the end cover 10a is conveniently realized.

Specifically, referring to FIG. 2 to FIG. 19, in some embodiments, a body portion 4 of the pressure relief device 10b is inserted into the second hole section 26, the first clamping portion 24 is disposed on an inner wall of the installation component 2, and the second clamping portion 42 is disposed on an outer wall of the main body portion 41. Alternatively, referring to FIG. 20 to FIG. 23, in some other embodiments, the main body portion 4 sleeves outside the installation component 2, the first clamping portion 24 is disposed on an outer wall of the installation component 2, and the second clamping portion 42 is disposed on an inner wall of the main body portion 41. In both cases, the first clamping portion 24 and the second clamping portion 42 are engaged or disengaged as the pressure relief device 10b rotates, so as to realize the disassembly and assembly of the pressure relief device 10b on the end cover 10a. When the main body portion 4 is inserted into the second hole section 26, it is beneficial to reduce a height of the pressure relief device 10b protruding from the end cover 10a. In one aspect, the space utilization rate of the battery cell 400 in the height direction and the energy density of the battery cell 400 are improved; in another aspect, possibility of collision between the pressure relief device 10b and other components during the installation or use of the battery cell 400 is reduced; and in yet another aspect, when the battery cell 400 is applied to the battery 200 or the electric equipment 100, it is also convenient to reserve a space above the battery cell 400 for installing a signal detection circuit and other structural components.

As can be seen, in the present application, the pressure relief device 10b can be quickly disassembled and assembled, which is convenient for liquid injection and exhaust, and can effectively improve the performances of the battery cell 400. Besides, in a maintenance process, the battery cell 400 does not need to be irreversibly damaged, and the appearance of the battery cell 400 is not affected.

Next, the solutions of the present application will be further described in conjunction with respective embodiments shown in FIG. 1D to FIG. 23.

Firstly, a first embodiment shown in FIG. 1D to FIG. 7C will be described.

As shown in FIG. 1D, in the present embodiment, the battery cell 400 is a prismatic cell, and includes an electrode assembly 30, and a shell 70 for accommodating the electrode assembly 30. The shell 70 includes a housing 7 and an end cover assembly 10. The end cover assembly 10 is disposed on one side of the housing 7 and covers an end opening 71 of the housing 7, so that a sealed space for accommodating the electrode assembly 30 is formed inside the shell 70.

Figure 2:
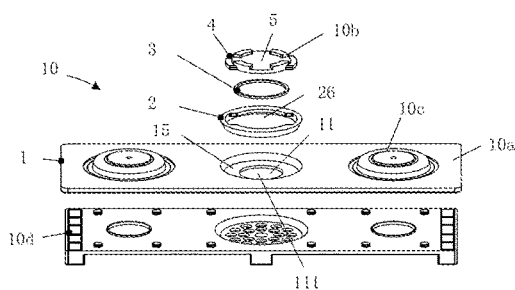
FIG. 2 is an exploded view of an end cover assembly in FIG. 1D.
Figure 3A:
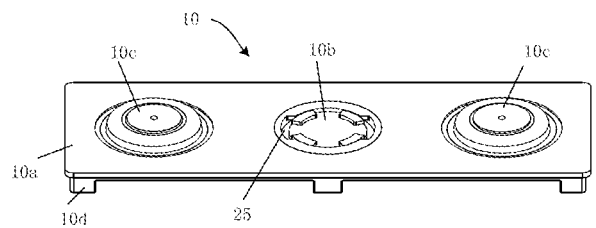
FIG. 3A is a perspective view of an end cover assembly shown in FIG. 2 when a pressure relief device is in a first position.

As shown in FIG. 2 and FIG. 3A, the end cover assembly 10 includes an end cover 10a, electrode terminals 10c, an insulating member 10d, a sealing ring 3, and a pressure relief device 10b. The end cover 10a is configured to be connected to the housing 7 to close the end opening 71 of the housing 7. A through hole 11 is disposed in the end cover 10a. The sealing ring 3 is for sealing the through hole 11. The insulating member 10d is disposed between the end cover 10a and the electrode assembly 30, and is configured to achieve insulation between the end cover 10a and the electrode assembly 30. Two electrode terminals 10c are disposed on the end cover 10a and located on both sides of the through hole 11 along a length direction. Meanwhile, the two electrode terminals 10c are electrically connected to a positive tab and a negative tab of the electrode assembly 30 through a connection member 20 respectively. The pressure relief device 10b is detachably disposed on the end cover 10a and inserted into the through hole 11 between the two electrode terminals 10c, so as to realize blocking and safety pressure relief functions of the through hole.

As shown in FIG. 2 and FIG. 5 to FIG. 6B, the end cover 10a includes an end cover body 1 and an installation component 2. The end cover body 1 is configured to be connected to the housing 7. The installation component 2 is connected to one side of the end cover body 1 away from the electrode assembly 30. Specifically, the aforementioned two electrode terminals 10c are disposed on the end cover body 1, an installation slot 15 is disposed between the two electrode terminals 10c, and the installation component 2 is disposed in the installation slot 15. The installation slot 15 is recessed toward the electrode assembly 30 from a surface of the end cover body 1 facing away from the electrode assembly 30, and the installation component 2 is fixed in the installation slot 15 by connection ways such as tight fitting, adhering, fastener connection, welding, or the like.

Figure 5:
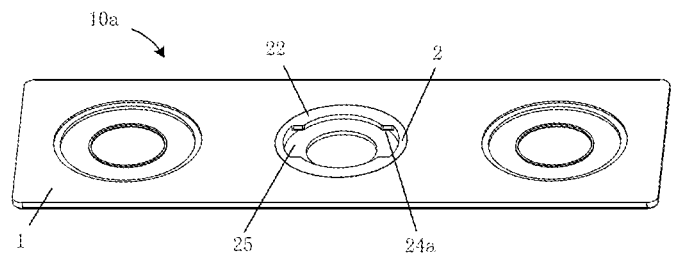
FIG. 5 is a perspective view of an end cover in FIG. 2.

With the installation slot 15 configured to accommodate the installation component 2, a height of the installation component 2 relative to the end cover body 1 is reduced, so that as shown in FIG. 5, a surface of the installation component 2 away from the electrode assembly 30 doesn't exceed the surface of the end cover body 1 away from the electrode assembly 30 and is lower than or flush with the surface of the end cover body 1 away from the electrode assembly 30 to reduce the height of the battery cell 400.

Figure 3B:
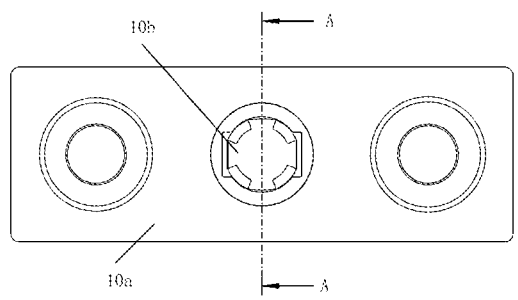
FIG. 3B is a top view of FIG. 3A without an electrode terminal and an insulating member.
Figure 3C:
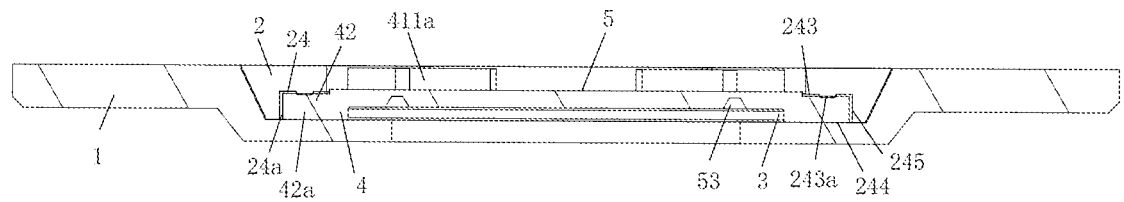
FIG. 3C is an A-A cross-sectional view of FIG. 3B.

As shown in FIG. 3C and FIG. 4C, the installation slot 15 is configured as a tapered slot with a wide upper side and a narrow lower side. Therefore, the side wall of the installation slot 15 guides the installation component 2 during insertion of the installation component 2. Meanwhile, when the installation component 2 is fixed in the installation slot 15 by laser welding, the installation slot 15 makes a laser incident path with no gap, so as to prevent a welding explosion point due to the gap, and improve a strength of a welding structure.

The through hole 11 penetrates the installation component 2 and the end cover body 1, and includes a first hole section 111 on the end cover body 1 and a second hole section 26 on the installation component 2. The first hole section 111 extends from a bottom of the installation slot 15 to a surface of the end cover body 1 facing the electrode assembly 30. The second hole section 26 is located on one side of the first hole section 111 away from the electrode assembly 30 and communicates with the first hole section 111. Moreover, a diameter of the second hole section 26 is larger than a diameter of the first hole section 111. In this way, when the through hole 11 is opened, electrolyte can be injected into the battery cell 400 through the through hole 11, or the gas inside the battery cell 400 can be exhausted. Since the through hole 11 has both liquid injection and exhaust functions, there is no need to separately dispose a liquid injection hole and an exhaust channel, then the number of holes on the end cover 10a is reduced, the space occupied by the holes is reduced, the space utilization rate is increased, and the energy density of the battery cell 400 is improved.

The sealing ring 3 is disposed at one end of the first hole section 111 close to the second hole section 26, and seals the first hole section 111 to seal the through hole 11. The sealing ring 3 is covered by the pressure relief device 10b and is extruded by the pressure relief device 10*b* to form a sealing surface between the pressure relief device 10*b* and the end cover body 1. In this case, a friction coefficient of a surface of the sealing ring 3 contacting the pressure relief device 10*b* is set to be smaller than a friction coefficient of a surface of the sealing ring 3 contacting the end cover 10*a*, such that a frictional force when the rotary pressure relief device 10*b* is rotated is reduced, an assembly difficulty is reduced, and abrasion of the sealing ring 3 is reduced. In order to reduce the frictional force between the sealing ring 3 and the pressure relief device 10*b*, lubricating oil or other manners such as a spacer with a low frictional force may be disposed between the sealing ring 3 and the pressure relief device 10*b*.

In order to realize the detachable connection between the pressure relief device 10*b* and the end cover 10*a*, as shown in FIG. 1D to FIG. 7C, in the present embodiment, the pressure relief device 10*b* is rotationally inserted into the second hole section 26, the end cover 10*a* is provided with a first clamping portion 24, and the pressure relief device 10*b* is correspondingly provided with a second clamping portion 42 to realize the rotary clamping between the pressure relief device 10*b* and the end cover 10*a*, so that the first clamping portion 24 and the second clamping portion 42 can be engaged or disengaged during rotation of the pressure relief device 10*b* between the first position and the second position relative to the end cover 10*a*. Therefore, the disassembly and assembly of the pressure relief device 10*b* on the end cover 10*a* is realized, and further the through hole 11 is opened and closed by the pressure relief device 10*b*.

Specifically, as can be seen from FIG. 1D to FIG. 7, in the present embodiment, the first clamping portion 24 is a clamping slot 24*a*, and the second clamping portion 42 is a clamping column 42*a*. An engaging structure is formed between the clamping slot 24*a* and the clamping column 42*a*. When the pressure relief device 10*b* is rotated to the first position, the clamping column 42*a* is wholly or partly located in the clamping slot 24*a* to limit a displacement of the pressure relief device 10*b* away from the electrode assembly 30, so that the pressure relief device 10*b* will not fall off from the end cover 10*a*, and stably close the through hole 11. When the pressure relief device 10*b* is rotated to the second position, the clamping column 42*a* and the clamping slot 24*a* are staggered along a circumferential direction of the through hole 11, and the clamping column 42*a* is completely separated from the clamping slot 24*a*, so that the displacement of the pressure relief device 10*b* away from the electrode assembly 30 is no longer limited by the end cover 10*a*, the pressure relief device 10*b* can be removed from the end cover 10*a*, and the through hole 11 is opened for maintenance work such as liquid injection, exhaust, and replacement of the pressure relief device 10*b*.

When the engagement or disengagement of the first clamping portion 24 and the second clamping portion 42 is realized by the rotation of the pressure relief device 10*b*, the structure is simple, matching accuracy requirements are low, and repeated use is realized. In terms of processing, the clamping column 42*a* disposed on the pressure relief device 10*b* and the clamping slot 24*a* disposed on the end cover 10*a* are both easy to process, and are especially suitable for a lithium-ion battery cell with a small overall size. In terms of assembly and maintenance, disassembly and assembly operations of the pressure relief device 10*b* are relatively easy, assembly efficiency of the battery cell 400 is improved during production, and maintenance time is shortened when in maintenance during use.

Moreover, the opening and closing of the through hole 11 are realized by the rotation of the pressure relief device 10*b*, so that the maintenance work such as liquid injection, exhaust, and replacement of the pressure relief device 10*b* can be performed without damaging the battery cell 400. When the pressure relief device 10*b* is removed and the electrolyte is injected through the through hole 11, the secondary liquid injection function is realized, which effectively reduces the decrease of a capacity of the battery cell 400 and prolongs the service life of the battery cell 400. When the pressure relief device 10*b* is removed and exhaust is performed through the through hole 11, the internal pressure of the battery cell 400 is released, thereby shortening a continuous action time of the gas inside the battery cell 400 on the pressure relief device 10*b*, and preventing liquid leakage and gas leakage problems caused by rupture of the pressure relief device 10*b* due to premature creeping, which is beneficial to prolong the service life of the pressure relief device 10*b*. In addition, when the pressure relief device 10*b* is removed and replaced, not only replacement requirements after the pressure relief device 10*b* is damaged can be met to prolong the service life of the battery cell 400, but also regular replacement requirements of the pressure relief device 10*b* not being ruptured can be met, so as to reduce the service life requirements of the pressure relief device 10*b* and improve the use reliability of the pressure relief device 10*b*.

Figures 6A, 6B:
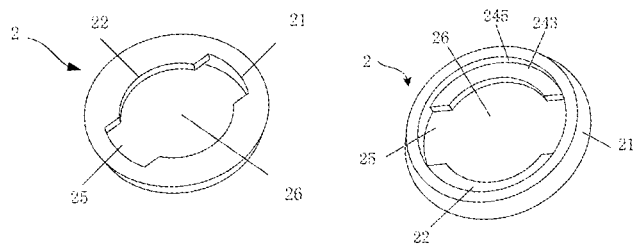
FIG. 6A is a first perspective view of an installation component shown in FIG. 2.
FIG. 6B is a second perspective view of the installation component shown in FIG. 2.

As shown in FIG. 6A to FIG. 6B, in the present embodiment, the clamping slot 24*a* is surrounded by the installation component 2 and the end cover body 1. Specifically, the installation component 2 includes an installation ring 21 and a limiting boss 22. A hollow part in the middle of the installation ring 21 serves as the second hole section 26. The limiting boss 22 is connected to an inner wall of the installation ring 21 and radially protrudes inward from the inner wall of the installation ring 21. There is a gap between the limiting boss 22 and a surface of the installation ring 21 facing the electrode assembly 30. In this way, as shown in FIG. 5, after the installation component 2 is installed in the installation slot 15, the clamping slot 24*a* serving as the first clamping portion 24 is formed between the limiting boss 22 and the slot bottom of the installation slot 15. In this case, the first clamping portion 24 is the clamping slot 24*a* enclosed by the installation component 2 and the end cover body 1, and in conjunction with FIG. 3C, FIG. 4C, FIG. 5 and FIG. 6B, it can be seen that a bottom wall of the limiting boss 22, a side wall of the installation ring 21 and a bottom wall of the installation slot 15 respectively form a first slot wall 243, a second slot wall 244 and a third slot wall 245 of the clamping slot 24*a*, which can limit a displacement of the clamping column 42*a* in the height direction when the clamping column 42*a* is inserted.

Moreover, based on the above arrangement, the clamping slot 24*a* is located on one side of the end cover 10*a* away from the electrode assembly 30, such that it is beneficial to prevent a short circuit of the battery cell 400 due to the fact that metal particles generated by friction in the rotary clamping process directly fall into the housing 7, thereby effectively improving working safety of the battery cell 400.

Specifically, as shown in FIG. 5 to FIG. 6B, the limiting boss 22 is disposed at one end of the installation ring 21 away from the first hole section 111, and the limiting boss 22 is flush with a surface of the installation ring 21 away from the first hole section 111. In this way, a height of the clamping slot 24*a* is increased, which is beneficial to improve an engagement strength between the first clamping portion 24 and the second clamping portion 42.

Figures 7A, 7B:
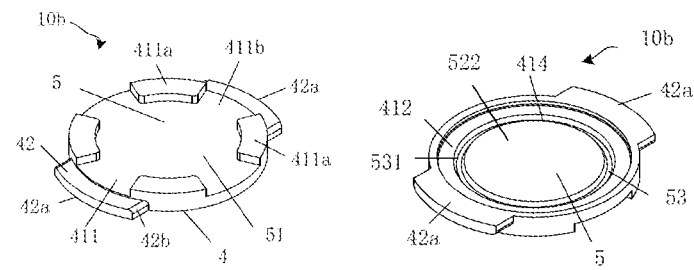
FIG. 7A is a first perspective view of a pressure relief device shown in FIG. 2.
FIG. 7B is a second perspective view of the pressure relief device shown in FIG. 2.
Figure 7C:
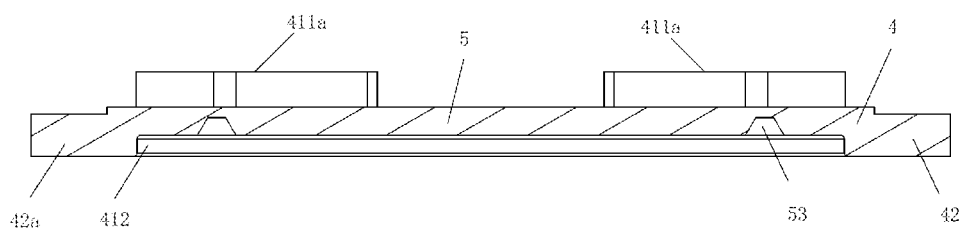
FIG. 7C is a cross-sectional view of the pressure relief device shown in FIG. 2.

As shown in FIG. 7A to FIG. 7C, in the present embodiment, in order to conveniently dispose the clamping column 42a and realize the blocking function of the pressure relief device 10b for the through hole 11, the pressure relief device 10b includes a main body portion 4 and a pressure relief member 5. The main body portion 4 has a disc-shaped or ring-shaped structure. The clamping column 42a is disposed on an outer wall of the main body portion 4 and protrudes outward from the outer wall of the main body portion 4 to form a cantilever structure, so that when the main body portion 4 is inserted into the second hole section 26, the clamping column 42a can be engaged with or disengaged from the clamping slot 24a as the main body portion 4 is rotated. The hollow part in the middle of the main body portion 4 forms a venting portion 414. The pressure relief member 5 is disposed at the venting portion 414 to close the venting portion 414. When the internal pressure of the battery cell 400 reaches the threshold, the pressure relief member 5 is damaged to remove the closure of the venting portion 414, such that the through hole 11 communicates with external environment through the venting portion 414, thereby realizing the pressure relief process and the safety protection function.

Specifically, in the present embodiment, the pressure relief member 5 and the main body portion 4 are integrally disposed. The pressure relief member 5 is connected to one end of the main body portion 4 away from the electrode assembly 30, and closes the venting portion 414 by closing an external port of the venting portion 414. The pressure relief member 5 is configured as a metal layer 51 such as an aluminum sheet 522.

Moreover, as shown in FIG. 4C and FIG. 7B to FIG. 7C, in the present embodiment, the pressure relief member 5 is provided with a groove 412, and the sealing ring 3 is located in the groove 412. Specifically, the groove 412 is processed by stamping, and the groove 412 is recessed to a direction away from the electrode assembly 30 from the surface of the pressure relief member 5 facing the electrode assembly 30. In this way, the space occupation of the sealing ring 3 is reduced, which is beneficial to reduce the overall height of the battery cell 400 and increase the energy density of the battery cell 400.

Meanwhile, as can be seen from FIG. 7B and FIG. 7C, in the present embodiment, the pressure relief member 5 is provided with a circle of notch 53, so that when the internal pressure of the battery cell 400 reaches the threshold, the notch 53 is firstly broken through, so as to realize a directional exhaust pressure relief of the battery cell 400, and prevent the battery cell 400 from exploding due to an excessive internal pressure. The notch 53 is located on a radial inner side of an inner ring of the sealing ring 3, such that the notch 53 is prevented from being accidentally ruptured due to an elastic force of the sealing ring 3.

In addition, as shown in FIG. 7A to FIG. 7C, in the present embodiment, at least two clamping columns 42a are disposed on the outer wall of the main body portion 4, and the at least two clamping columns 42a are disposed at intervals along a circumferential direction of the main body portion 4 and all extend along the circumferential direction of the through hole 11. In this case, as shown in FIG. 5 to FIG. 6B, the number of the limiting bosses 22 enclosing the clamping slot 24a on the end cover 10a is at least two, and the limiting bosses 22 extend along the circumferential direction of the through hole 11 and correspond to the clamping columns 42a one to one, so that the end cover 10a is provided with at least two clamping slots 24a, and the clamping slots 24a extend along the circumferential direction of the through hole 11 and correspond to the clamping columns 42a one to one. Based on this, the pressure relief device 10b has multiple limiting supports at the first position, which is not only beneficial to improve an installation stability and firmness of the pressure relief device 10b, but also beneficial to reduce an engagement force of the single clamping column 42a to reduce strength requirements of the clamping column 42a.

By setting the number and interval angle of the limiting bosses 22, a rotary angle of the pressure relief device 10b between the first position and the second position is controlled. For example, when the two limiting bosses 22 are disposed on the installation component 2 oppositely, the pressure relief device 10b can be rotated from the first position to the second position or from the second position to the first position by only rotating 90°, which is beneficial to improve the efficiency of disassembly and assembly. Of course, the angle of the pressure relief device 10b between the first position and the second position is not limited to 90°, for example, the angle may be changed within 60°-120°, and is specifically set according to actual needs.

As can be seen from FIG. 5 to FIG. 6B, a space between the two limiting bosses 22 disposed at intervals forms a guide slot 25, the guide slot 25 is in communication with the clamping slot 24a for guiding the clamping column 42a to enter and exit the clamping slot 24a, thereby improving smoothness of the rotary clamping process. A circumferential length of the guide slot 25 is greater than a circumferential length of the clamping column 42a, so that the clamping column 42a is accommodated by the guide slot 25 when the pressure relief device 10b is at the second position. Meanwhile, the circumferential length of the guide slot 25 does not exceed a circumferential length of the clamping slot 24a, so as to increase an engagement length of the clamping column 42a and the clamping slot 24a as much as possible and improve a limiting stability.

In addition to guiding the clamping column 42a to smoothly enter and exit the clamping slot 24a by disposing the guide slot 25, as shown in FIG. 7A, an inclined surface 42b is disposed on the clamping column 42a to guide the clamping column 42a to enter and exit the clamping slot 24a. Specifically, the inclined surface 42b is disposed on the side wall of the clamping column 42a in the circumferential direction, and the inclined surface 42b is configured to gradually reduce a thickness of a side part of the clamping column 42a in the circumferential direction from inside to outside. Based on this, the inclined surface 42b guides the clamping column 42a to smoothly enter the clamping slot 24a without a need to adjust a height of the clamping column 42a in advance, such that assembly efficiency is improved, and a collision between the clamping column 42a and an entrance of the clamping slot 24a is prevented. Therefore, it is beneficial to prolong the service life of the end cover assembly 10 and reduce the generation of metal chips.

The inclined surface 42b is a flat surface, a curved surface or the like. In addition, the inclined surface 42b is disposed on one side or both sides in the circumferential direction of the clamping column 42a. When both sides of the clamping column 42a in the circumferential direction are provided with the inclined surfaces 42b, it is beneficial to guide the clamping column 42a to enter and exit the clamping slot 24a more smoothly.

The inclined surface 42b disposed on the clamping column 42a is easier to process. However, as an alternative, the inclined surface 42b is disposed on a slot wall of the clamping slot 24a. For example, the inclined surface 42b is disposed on the first slot wall 243 or the second slot wall 244.

In order to facilitate the clamping column 42a to enter and exit the clamping slot 24a by rotation, a height of the clamping slot 24a is greater than that of the clamping column 42a. In this way, after the clamping column 42a enters the clamping slot 24a, the clamping column 42a contacts the first slot wall 243 under the elastic force of the sealing ring 3, and there is a gap between a bottom surface of the clamping column 42a and the second slot wall 244.

FIG. 3A to FIG. 3C and FIG. 4A to FIG. 4C show states of the pressure relief device 10b at the first position and the second position respectively. As shown in FIG. 3A to FIG. 3C, when the pressure relief device 10b is rotated to the first position, the clamping column 42a is inserted into the clamping slot 24a, so that the clamping slot 24a prevents the pressure relief device 10b from leaving from the end cover 10a. As shown in FIG. 4A to FIG. 4C, when the pressure relief device 10b is rotated to the second position, the clamping column 42a is disengaged from the clamping slot 24a and enters the guide slot 25, so that the pressure relief device 10b is no longer limited by the clamping slot 24a, then the pressure relief device 10b can be removed from the end cover 10a to open the through hole 11.

Specifically, as can be seen from FIG. 3C, when the pressure relief device 10b is at the first position, the clamping column 42a abuts against the first slot wall 243 of the clamping slot 24a away from the electrode assembly 30, so that the first slot wall 243 limits the displacement of the pressure relief device 10b away from the electrode assembly 30 to prevent the pressure relief device 10b from being separated from the end cover 10a. More specifically, the first slot wall 243 includes a protruding portion 243a. The protruding portion 243a protrudes toward one side of the electrode assembly 30 relative to the remaining part of the first slot wall 243, and abuts against the clamping column 42a, so that the first slot wall 243 abuts against the clamping column 42a through the protruding portion 243a.

Further, in order to reduce the resistance when the pressure relief device 10b is rotated, there is a gap between the second slot wall 244 opposite to the first slot wall 243 and the clamping column 42a. Similarly, in order to reduce the resistance when the pressure relief device 10b is rotated, there is a gap between the third slot wall 245 connected between the first slot wall 243 and the second slot wall 244 and the clamping column 42a.

When the pressure relief device 10b needs to be installed, a downward force is applied to the pressure relief device 10b, and a gap is generated between the clamping column 42a and the first slot wall 243 through a deformation of the sealing ring 3. At this point, rotating the pressure relief device 10b to allow the clamping column 42a to enter the clamping slot 24a smoothly. After reaching the first position, the pressure relief device 10b is released, and the pressure relief device 10b moves upward under the elastic force of the sealing ring 3, until a top surface of the clamping column 42a abuts against the first slot wall 243, then a gap (not shown in the figure) appears between the bottom surface of the clamping column 42a and the second slot wall 244.

When the pressure relief device 10b needs to be disassembled, a downward force is applied to the pressure relief device 10b, and the gap is generated between the clamping column 42a and the first slot wall 243 through the deformation of the sealing ring 3. At this point, rotating the pressure relief device 10b to make the clamping column 42a being smoothly staggered from the clamping slot 24a in the circumferential direction, and wholly in the guide slot 25. At this time, the second position is reached, then the pressure relief device 10b can be removed, and the operations such as liquid injection, exhaust or replacement of the pressure relief device 10b can be performed.

The first slot wall 243, the second slot wall 244 and the third slot wall 245 are flat surfaces or curved surfaces. When contact surfaces of the first slot wall 243 and the clamping column 42a are both the flat surfaces, an abutting area between the first slot wall 243 and the clamping column 42a is increased to improve the engagement stability, and a frictional force between the first slot wall 243 and the clamping column 42a is increased, such that the difficulty of circumferential rotation of the pressure relief device 10b relative to the end cover 10a in an engaged state is increased.

In addition, returning to FIG. 7A to FIG. 7C, in the present embodiment, in order to facilitate the rotation of the pressure relief device 10b, the pressure relief device 10b further includes an operating portion 411, the operating portion 411 is configured to receive an external operation to drive the pressure relief device 10b to rotate. By disposing the operating portion 411, the pressure relief device 10b can be easily rotated with cooperation of a tool and the operating portion 411. It is convenient to apply an external force when the pressure relief device 10b is disassembled and assembled, and it is easy to control the rotary angle of the pressure relief device 10b.

Specifically, as shown in FIG. 7A, in the present embodiment, at least two bosses 411a are disposed on the surface of the pressure relief member 5 away from the electrode assembly 30, and the at least two operating portions 411 are disposed at intervals along the circumferential direction of the through hole 11. The operating portion 411 includes a slot portion 411b located between two adjacent bosses 411a. In this case, the tool can be inserted into the slot portion 411b to rotate the pressure relief device 10b. An assembly process of the battery cell 400 according to the present embodiment includes: firstly, placing the installation component 2 into the installation slot 15 and welding the installation component 2; then, injecting electrolyte through the through hole 11, and installing the sealing ring 3 after the liquid injection is completed; then placing the pressure relief device 10b at the second position on the end cover 10a, so that the pressure relief device 10b covers at least part of the sealing ring 3, and the clamping column 42a of the pressure relief device 10b and the clamping slot 24a of the end cover 10a are circumferentially staggered and disengaged from each other; then clamping the slot portion 411b with a special tool, and applying a downward action force to form a gap between the clamping column 42a and the first slot wall 243 of the clamping slot 24a, and meanwhile, rotating the pressure relief device 10b from the second position to the first position, so that the clamping column 42a is clamped in the clamping slot 24a to limit the separation of the pressure relief device 10b from the end cover 10a; and after rotating in place, releasing the pressure relief device 10b, so that the pressure relief device 10b moves upwards under the elastic force of the sealing ring 3, and the pressure relief device 10b abuts against the first slot wall 243.

When it is necessary to perform the maintenance operations such as secondary liquid injection, exhaust, or replacement of the pressure relief device 10b on the battery cell 400, clamping the tool to the slot portion 411b, and rotating the pressure relief device 10b in an opposite direction from the first position back to the second position, then removing the pressure relief device 10b, and removing the sealing ring 3. After the operations such as liquid injection and exhaust are completed, the aforementioned assembly process is repeated to complete the maintenance of the battery cell 400.

Next, a second embodiment is described in combination with FIG. 8 to FIG. 10A. In order to simplify the description, only differences between the second embodiment and the aforementioned first embodiment are mainly described.

As shown in FIG. 8 to FIG. 10A, the second embodiment differs from the aforementioned first embodiment mainly in that the structure of the pressure relief device 10b is different.

Specifically, as can be seen from FIG. 8 to FIG. 10A, in the second embodiment, the main body portion 4 and the pressure relief member 5 of the pressure relief device 10b are no longer integrally disposed, but separately disposed. The pressure relief member 5 still includes the metal layer structure 51 such as the aluminum sheet 522, and is located between the main body portion 4 and the sealing ring 3 instead of being connected to one end of the main body portion 4 away from the electrode assembly 30. In this case, the pressure relief member 5 covers the sealing ring 3, and closes the venting portion 414 by closing an opening at one end of the venting portion 414 of the main body portion 4 close to the electrode assembly 30 (that is, the lower port of the venting portion 414), thus the closure of the through hole 11 is achieved. After the pressure relief member 5 is destroyed, the through hole 11 communicates with the external environment through the venting portion 414, so as to realize the liquid injection and gas replenishment process.

Figure 8:
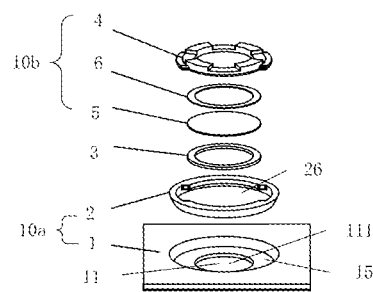
FIG. 8 is an exploded view of an end cover assembly in a second embodiment of the present application.

Since the pressure relief member 5 is no longer connected to the main body portion 4, when being rotated, the main body portion 4 does not drive the pressure relief member 5 to rotate therewith, and there is relative rotation between the main body portion 4 and the pressure relief member 5. In this case, in order to reduce the abrasion of the pressure relief member 5 during rotation of the main body portion 4, as shown in FIG. 8, the present relief device 10b further includes a separation ring 6, the separation ring 6 is disposed between the main body portion 4 and the pressure relief member 5 to separate the main body portion 4 from the pressure relief member 5, such that the abrasion of the pressure relief member 5 during rotation of the main body portion 4 is reduced to protect the pressure relief member 5.

Figures 9, 10A:
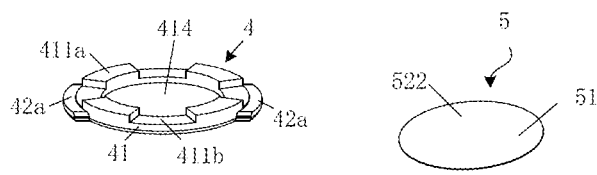
FIG. 9 is a perspective view of a main body portion in FIG. 8.
FIG. 10A is a perspective view of a pressure relief member in FIG. 9.
Figures 10B, 10C:
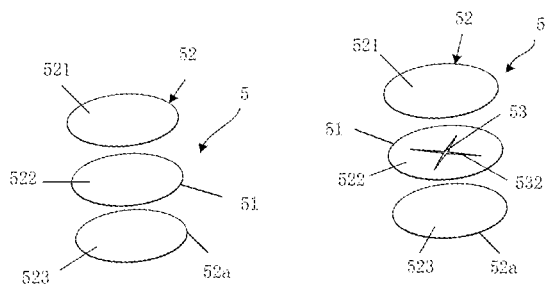
FIG. 10B is a first variant example of the pressure relief member shown in FIG. 10A.
FIG. 10C is a second variant example of the pressure relief member shown in FIG. 10A.
Figure 11:
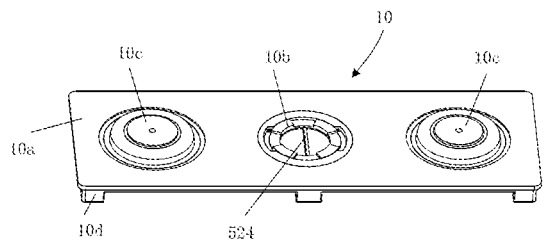
FIG. 11 is a perspective view of an end cover assembly in a third embodiment of the present application.

FIG. 10B and FIG. 10C show a first variant embodiment and a second variant embodiment of the pressure relief member 5 shown in FIG. 10A respectively.

As shown in FIG. 10B and FIG. 10C, in both the first embodiment and the second variant embodiment, the pressure relief member 5 no longer adopts a single-layer structure, but adopts a multi-layer structure. Specifically, the pressure relief member 5 is an aluminum plastic film 52, which includes a first protective layer 521 made of nylon or PET, a second protective layer 523 made of polypropylene, and the metal layer 51 such as the aluminum sheet 522 between the first protective layer 521 and the second protective layer 523.

The aluminum plastic film 52 has electrolyte leakage preventing and waterproofing capabilities equivalent to a metal material, and the aluminum plastic film 52 has a deformation resistance more excellent than the single metal layer 51 with the notch 53, therefore, damage and liquid leakage caused by accidental deformation can be effectively prevented.

By comparing FIG. 10B and FIG. 10C, it can be seen that the difference between the two variant embodiments is that, in the first variant embodiment shown in FIG. 10B, no notch 53 is disposed on the metal layer 51, while in the second variant example shown in FIG. 10C, the notch 53 is disposed on the metal layer 51, and the notch 53 is no longer an annular slot 531, but a cross-shaped slot 532.

Compared with the first variant embodiment, the notch 53 is further disposed on the metal layer 51 in the second variant example, such that a pressure resistance value of the aluminum plastic film 52 is reduced, thereby further meeting the safety protection requirements of the battery cell 400 with a low burst pressure.

In the case where the pressure relief member 5 is the aluminum plastic film 52, the aforementioned separation ring 6 disposed between the pressure relief member 5 and the main body portion 4 can prevent the aluminum plastic film 3 from being abraded by the main body portion 4 in the rotary clamping process, so as to avoid a sealing failure of the aluminum plastic film 3 due to abrasion.

Next, a third embodiment shown in FIG. 12 to FIG. 17 will be described.

As shown in FIG. 12 to FIG. 17, the third embodiment mainly differs from the aforementioned embodiments in that, the pressure relief device 10b no longer includes only one pressure relief member 5, but includes at least two pressure relief members 5. These at least two pressure relief members 5 are connected to each other, and when the internal pressure of the battery cell 400 reaches the threshold, the pressure relief device 10b is destroyed at a connected part of these pressure relief members 5.

Figure 16:
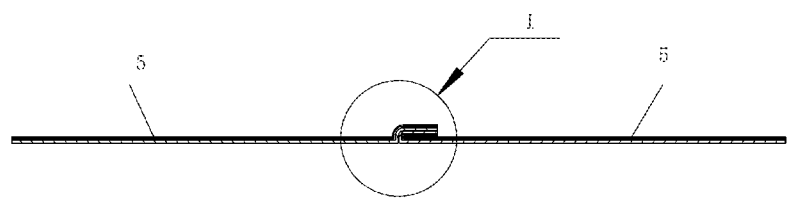
FIG. 16 is a cross-sectional view of the pressure relief member shown in FIG. 15.

Specifically, as can be seen from FIG. 15 to FIG. 17, in the third embodiment, the pressure relief device 10b includes two pressure relief members 5, the two pressure relief members 5 are partially overlapped and are connected at an overlapping part 524 by means of heat sealing. More specifically, the pressure relief member 5 is the aluminum plastic film 52.

Based on the above arrangement, an aluminum plastic film seal is formed between the two aluminum plastic films 52 by heat sealing. In a heat sealing process of the seal, a strength of the seal can be controlled to be much lower than a pressure resistance strength of the aluminum plastic film 52 itself, therefore, a pressure relief and explosion-proof process of a lower threshold is realized. Moreover, compared with the manner of disposing the notch 53 on the metal layer 51 of the aluminum plastic film 52, the heat sealing process of the seal is easier to operate, which can avoid the difficulty of controlling the notch 53 on the metal layer 51 and improve production efficiency.

In addition, as shown in FIG. 12 to FIG. 15, in the third embodiment, the overlapping part 524 protrudes to one side away from the sealing ring 3 relative to the remaining parts of the pressure relief members 5, the separation ring 6 is provided with an accommodating slot 61, and the overlapping part 524 is accommodated in the accommodating slot 61. Based on this, an uneven stress between the main body portion 4 and the pressure relief member 5 due to the protrusion of the overlapping part 524 is prevented.

Meanwhile, as shown in FIG. 17, in the third embodiment, the overlapping part 524 is bent toward one side close to the electrode assembly 30, so that a height of the overlapping part 524 is reduced compared with the case where the overlapping part 524 is not bent, which is beneficial to reduce the height of the end cover assembly 10, increase the space utilization rate of the battery cell 400 in the height direction, and increase the energy density of the battery cell 400.

As a variant of the pressure relief device 10b in the third embodiment, as shown in FIG. 18, the two pressure relief members 5 are still partially overlapped, but the overlapping part 524 is no longer bent, and the pressure relief member is no longer a multi-layer structure, but a single-layer structure.

As another variant of the pressure relief device 10b in the third embodiment, as shown in FIG. 19, the two pressure relief members 5 are still multi-layer structures, but the two pressure relief members 5 are butted with each other without overlapping.

Next, a fourth embodiment shown in FIG. 20 to FIG. 23 will be described.

As shown in FIG. 20 to FIG. 23, the fourth embodiment mainly differs from the aforementioned embodiments in that the main body portion 4 is no longer inserted into the installation component 2, but sleeves outside the installation component 2, and the first clamping portion 24 is no longer enclosed by the installation component 2 and the end cover body 1, but is disposed on the installation component 2 and located on the outer side wall of the installation component 2. Correspondingly, the second clamping portion 42 is disposed on the inner side wall of the main body portion 4.

By sleeving the pressure relief device 10b outside the installation component 2, it is convenient for an operator to directly apply an external force to the pressure relief device 10b to rotate the pressure relief device 10b, the operation is easy, and no special tool needs to be designed, thus the assembly and maintenance efficiency is improved. Moreover, when the pressure relief device 10b sleeves outside the installation component 2, the installation component 2 generally protrudes from the surface of the end cover body 1, therefore, by disposing the first clamping portion 24 on the outer side wall of the installation component 2, on one hand, the strength of the end cover body 1 can be improved, and on the other hand, the thickness of the end cover body 1 can be reduced.

Figure 21:
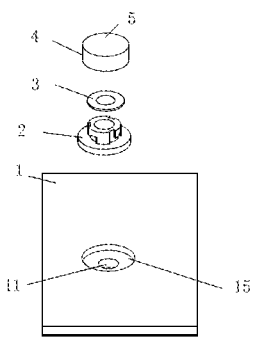
FIG. 21 is an exploded view of the end cover assembly shown in FIG. 20.
Figures 22, 23:
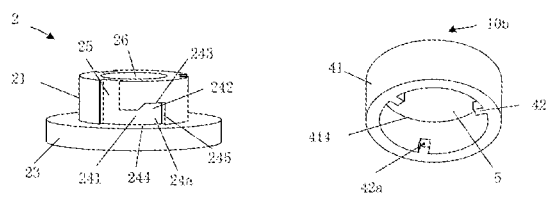
FIG. 22 is a perspective view of the installation component in FIG. 21.
FIG. 23 is a perspective view of the pressure relief device in FIG. 21.

As shown in FIG. 21 and FIG. 22, the installation component 2 includes an installation ring 21 and a base 23. The base 23 is fixed in the installation slot 15. For example, the base 23 is fixed in the installation slot 15 by a manner such as tight fitting, adhering, welding or fastener connection. The installation ring 21 is connected to one end of the base 23 away from the electrode assembly 30. In this way, the installation ring 21 protrudes from the surface of the end cover body 1 away from the electrode assembly 30, which facilitates the sleeving of the pressure relief device 10b. Moreover, by disposing the base 23 in the installation slot 15, an overall height of the end cover assembly 10 can be reduced to a certain extent. Meanwhile, the disposed base 23 is also convenient to increase installation stability of the installation ring 21.

As shown in FIG. 22 and FIG. 23, in the fourth embodiment, the first clamping portion 24 is a clamping slot 24a disposed on an outer side wall of the installation ring 21, and correspondingly, the second clamping portion 42 is a clamping column 42a disposed on an inner side wall of the main body portion 4. When the pressure relief device 10b is rotated to the first position, the clamping column 42a is embedded into the clamping slot 24a, so as to realize the installation of the pressure relief device 10b on the end cover 10a. Specifically, as shown in FIG. 22, the clamping slot 24a is located on one side of the installation ring 21 close to the base 23, and a top surface of the base 23 is used as the second slot wall 244. The clamping slot 24a includes a first clamping slot 241, and the first clamping slot 241 extends along a circumferential direction of the installation ring 21. In addition, the clamping slot 24a further includes a second clamping slot 242. The second clamping slot 242 communicates with the first clamping slot 241 and is located above the first clamping slot 241, that is, the second clamping slot 242 is located on one side of the first clamping slot 241 away from the base 23. In this case, when the pressure relief device 10b is rotated to the first position, the clamping column 42a is embedded into the second clamping slot 242, and there is a gap between the clamping column 42a and the base 23, so that the pressure relief device 10b has smaller resistance during rotation.

At least two clamping slots 24a are disposed at intervals along the circumferential direction, and correspondingly, at least two clamping columns 42a are disposed along the circumferential direction. In this case, as shown in FIG. 22, a guide slot 25 is disposed between adjacent clamping slots 24a to guide the clamping columns 42a to enter and exit the clamping slots 24a smoothly. Specifically, a top end of the guide slot 25 penetrates the top of the installation ring 21. A bottom end of the guide slot 25 communicates with the clamping slot 24a. More specifically, the bottom end of the guide slot 25 communicates with one side of the first clamping slot 241 away from the second clamping slot 243, so that the guide slot 25 and the clamping slot 24a are connected to form an L-shaped slot, in this way, during the process that the main body portion 4 sleeves the installation ring 21 and is rotated, the clamping column 42a can smoothly enter the clamping slot 24a and be engaged with the second clamping slot 243 under the guidance of the guide slot 25.

In addition, as shown in FIG. 21 and FIG. 23, in the fourth embodiment, the pressure relief member 5 is disposed in a manner similar to that of the first embodiment, and is still integrally disposed at one end of the main body portion 4 away from the electrode assembly 30. However, the arrangement of the sealing ring 3 has changed, the sealing ring 3 is disposed in the pressure relief device 10b instead of being disposed at one end of the first hole section 111 close to the second hole section 26, and is specifically located between the clamping column 42a and the pressure relief member 5, so that the pressure relief device 10b conveniently extrudes the sealing ring 3 to improve the sealing effect.

The assembly process of the battery cell 400 of the fourth embodiment is as follows:

Firstly, the installation component 2 is placed in the installation slot 15 and welded; then, the electrolyte is injected through the through hole 11; then the sealing ring 3 is attached to a lower surface of the pressure relief member 5; and finally, the pressure relief device 10b is sleeved outside the installation component 2. During the sleeving process, the clamping column 42a enters the clamping slot 24a through the guide slot 25. After the clamping column 42a reaches the clamping slot 24a, a downward force is applied to the pressure relief device 10b, the pressure relief device 10b is rotated to move the clamping column 42a in the clamping slot 24a, until the pressure relief device 10b is rotated to the first position where the clamping column 42a reaches the second clamping slot 243, and then the pressure relief device 10b is released, so that the pressure relief device 10b moves upwards to abut against the top wall of the second clamping slot 243 under the action of an elastic force of the sealing ring 3 to limit the separation of the pressure relief device 10b from the end cover 10a, and the assembly is completed.

When it is necessary to perform a secondary liquid injection on the battery cell 400, the pressure relief device 10b is oppositely rotated, so that the pressure relief device 10b is rotated from the first position to the second position, then the pressure relief device 10b and the sealing ring 3 are removed to perform liquid injection, and after the liquid injection is completed, the aforementioned assembly process is repeated to complete the maintenance of the battery cell 400.

Based on the foregoing introduction, it can be known that each embodiment of the present application has a liquid-injection explosion-proof integrated structure, and can realize rapid disassembly and assembly of the pressure relief device 10b and perform the maintenance operations such as liquid injection, exhaust and replacement of the pressure relief device without damaging the battery cell 400, such that the energy density of the battery cell 400 is effectively improved, the service life of the battery cell 400 is prolonged, and the working reliability of the battery cell 400 is improved, thereby the performances of the battery cell 400 being effectively improved.

Figure 24:
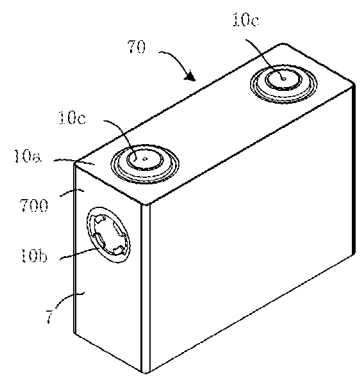
FIG. 24 is a perspective view of a shell assembly in some embodiments of the present application.

Based on the improvements on the end cover assembly 10 in the foregoing respective embodiments, referring to FIG. 24, the present application also provides a housing assembly 700 for a battery cell 400, and the housing assembly 700 includes:

a housing 7, wherein the housing 7 is configured to be connected to an end cover 10a to form a shell 70 of the battery cell 400, the housing 7 is provided with a through hole 11 and a first clamping portion 24, and the first clamping portion 24 is disposed along a circumferential direction of the through hole 11 and is located on one side of the housing 7 away from an interior of the battery cell 400;

a sealing ring 3 for sealing the through hole 11; and a pressure relief device 10b covering at least part of the sealing ring 3, closing the through hole 11 and configured to remove a closure of the through hole 11 when an air pressure in the housing 7 reaches a preset pressure;

wherein the pressure relief device 10b includes a second clamping portion 42 and is rotatable, such that when the pressure relief device 10b is rotated to a first position, the second clamping portion 42 is clamped with the first clamping portion 24 to limit separation of the pressure relief device 10b from the housing 7, and when the pressure relief device 10b is rotated to a second position, the second clamping portion 42 is disengaged from the first clamping portion 24 to realize separation of the pressure relief device 10b from the housing 7.

Based on the above arrangement, the through hole 11, the sealing ring 3 and the pressure relief device 10b are no longer disposed on the end cover 10a, but disposed on the housing 7 connected to the end cover 10a. The pressure relief device 10b can be selected from any of the embodiments described in the section of the end cover assembly 10 above.

The housing 7 does not need to be provided with other components such as the electrode terminal 10c and an end cover temperature collection structure, therefore, a remaining area of the housing 7 is relatively large, which is more convenient to dispose the through hole 11, the sealing ring 3 and the pressure relief device 10b. Moreover, when the through hole 11 is disposed on the housing 7 with a larger remaining area, sizes of the through hole 11 and the pressure relief device 10b are convenient to increase, such that the efficiency of liquid injection, a structural strength of the pressure relief device 10b and closing reliability of the through hole 11 by the pressure relief device 10b are further improved, and the disassembly and assembly of the pressure relief device 10b have a larger operating space, thereby the disassembly and assembly efficiency being improved.

Specifically, as shown in FIG. 24, the through hole 11 is disposed in the wall of the housing 7 adjacent to the end cover 10a, so that the battery cell 400 can be stably placed with the end cover 10a facing upward. For example, the through hole 11 is disposed in the wall adjacent to the largest side surface of the housing 7, so that when a plurality of battery cells 400 are placed flat or upright to form a battery module 300, the largest side surfaces of adjacent battery cells 400 can still be kept in contact. Thereby the structure of the battery module 300 being more stable and the volume being reduced.

The housing assembly 700 according to the present application can flexibly and conveniently realize the repeated disassembly and assembly of the pressure relief device 10b, so that when the electrolyte is insufficient or performances of the electrolyte are reduced, the pressure relief device 10b can be conveniently removed for secondary liquid injection, and the gas in the battery cell 400 is exhausted. After the secondary liquid injection is completed, the through hole 11 can be reliably closed, which ensures the working reliability of the battery cell 400 after the secondary liquid injection, and keeps the appearance of the battery cell 400 consistent with that before the liquid injection.

When including the housing assembly 700 of the present application, the shell 70 no longer includes the end cover assembly 10 in the foregoing embodiments, but only includes the end cover 10a.

Figure 25:
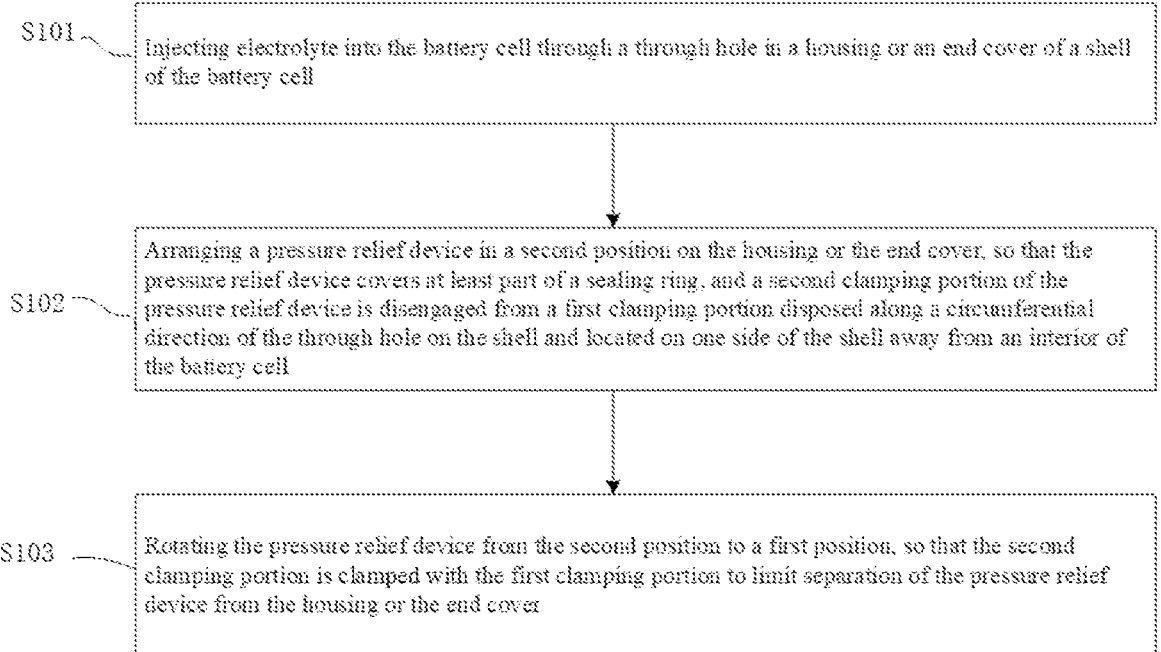
FIG. 25 is a schematic flowchart of a liquid injection method in some embodiments of the present application.

In addition, the present application also provides a liquid injection method for a battery cell 400. Referring to FIG. 25, the liquid injection method includes:

S101: injecting electrolyte into the battery cell 400 through a through hole 11 in a housing 7 or an end cover 10a of a shell 70 of the battery cell 400;

S102: arranging a pressure relief device 10b in a second position on the housing 7 or the end cover 10a, so that the pressure relief device 10b covers at least part of a sealing ring 3, and a second clamping portion 42 of the pressure relief device 10b is disengaged from a first clamping portion 24 disposed along a circumferential direction of the through hole 11 on the shell 70 and located on one side of the shell 70 away from the interior of the battery cell 400; and S103: rotating the pressure relief device 10b from the second position to a first position, so that the second clamping portion 42 is clamped with the first clamping portion 24 to limit separation of the pressure relief device 10b from the housing 7 or the end cover 10a.

Compared with the traditional manner of sealing a liquid injection hole by laser welding, in the present application, not only welding and sealing procedures of the liquid injection hole are omitted, but also many other procedures such as subsequent cleaning of welding slag caused by the welding and drying of cleaning residual liquid are omitted. Therefore, the present application improves production efficiency of the battery cell. The present disclosure realizes the engagement or disengagement of the second clamping portion 42 and the first clamping portion 24 through rotation of the pressure relief device 10b, which is simple and fast, such that the assembly efficiency of the pressure relief device 10b in the assembly process of the battery cell 400 is improved, thereby further improving the production efficiency of the battery cell.

Figure 26:
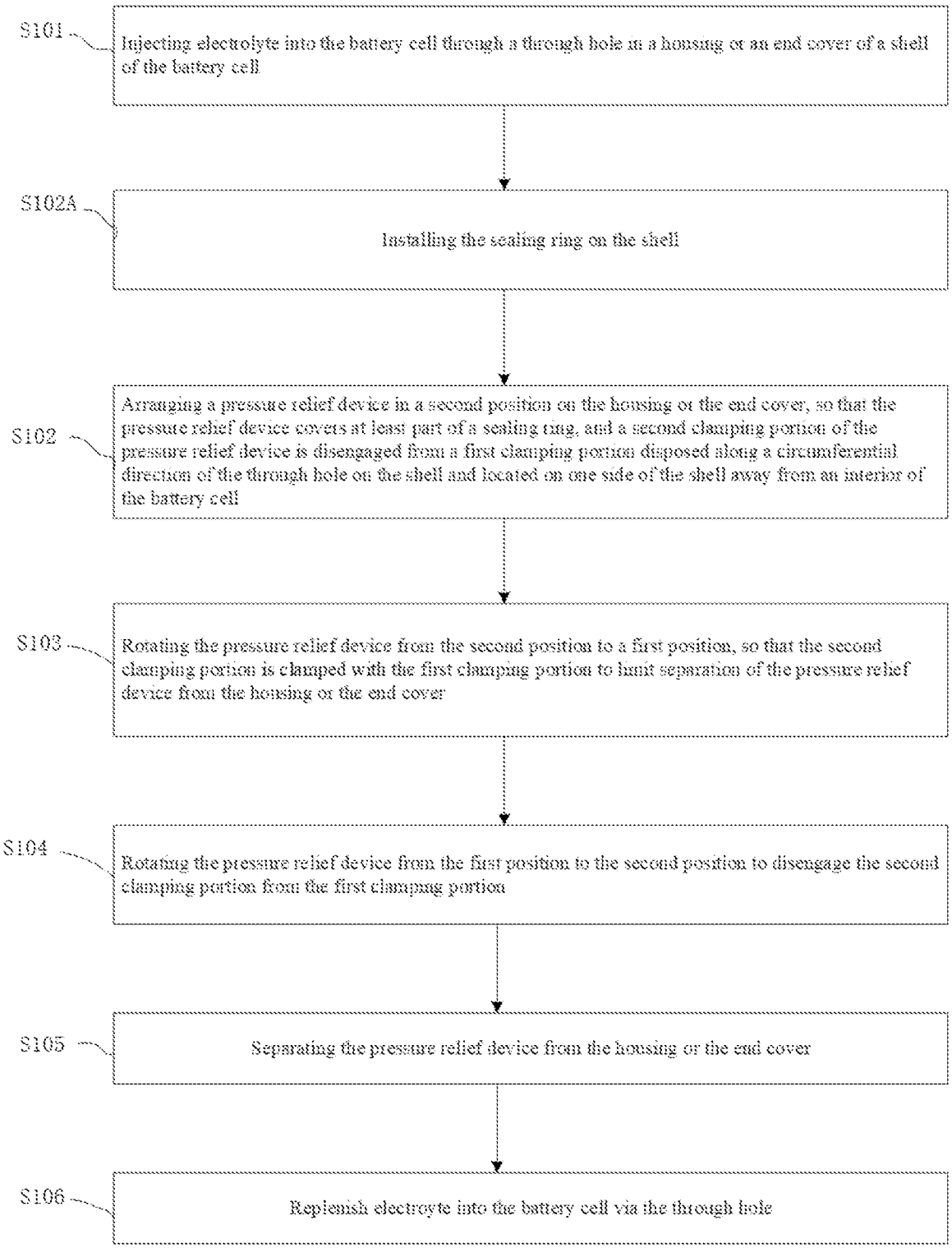
FIG. 26 is a schematic flowchart of a liquid injection method in some other embodiments of the present application.

Further, as shown in FIG. 26, before arranging the pressure relief device 10b at the second position on the housing 7 or the end cover 10a in step S102, the liquid injection method further includes:

S102A, installing the sealing ring 3 on the shell 70.

In the present embodiment, the sealing ring 3 is installed on the shell 70 in advance, such that the installed pressure relief device 10b covers the sealing ring 3, or applying a pressing force on the sealing ring 3, thereby realizing a better sealing affect for the through hole 11. For example, for respective embodiments shown in FIG. 1D to FIG. 19, the sealing ring 3 may be installed on the end cover 10a in advance; while for the embodiments shown in FIG. 20 to FIG. 23, the sealing ring 3 may be attached to the lower surface of the pressure relief member 5 in advance.

Continuing to refer to FIG. 26, in some embodiments, the liquid injection method further includes:

S104: rotating the pressure relief device 10b from the first position to the second position to disengage the second clamping portion 42 from the first clamping portion 24; and S105: separating the pressure relief device 10b from the housing 7 or the end cover 10a.

The pressure relief device 10b is removed from the shell 70 to facilitate maintenance operations such as liquid injection, exhaust, or replacement of the pressure relief device 10b. For example, after step S015, step S106 may be executed to replenish the electrolyte into the battery cell 400 via the through hole 11 to realize a secondary liquid injection function.

After the maintenance is completed, the installation of the pressure relief device 10b is completed through steps S101 to S103, and the through hole 11 is simply and conveniently closed again.

The liquid injection method can flexibly and conveniently realize the repeated disassembly and assembly of the liquid injection device 10b, and can reliably close the through hole 11 after the secondary liquid injection is completed, which ensures the working reliability of the battery cell 400 after the secondary liquid injection, and also keeps the appearance of the battery cell consistent with that before the liquid injection; moreover, the maintenance time can be shortened during the secondary liquid injection, and liquid can be replenished in time when the performances of the battery cell 400 are reduced to ensure the performances of the battery cell 400.

In addition, after separating the pressure relief device 10b from the housing 7 or the end cover 10a in step S105, the sealing ring 3 is removed at first to facilitate the pouring of the electrolyte in the shell 70 and prevent the electrolyte from flowing to the sealing ring 3, so that the sealing ring 3 is kept clean and the service life is prolonged.

Figure 27:
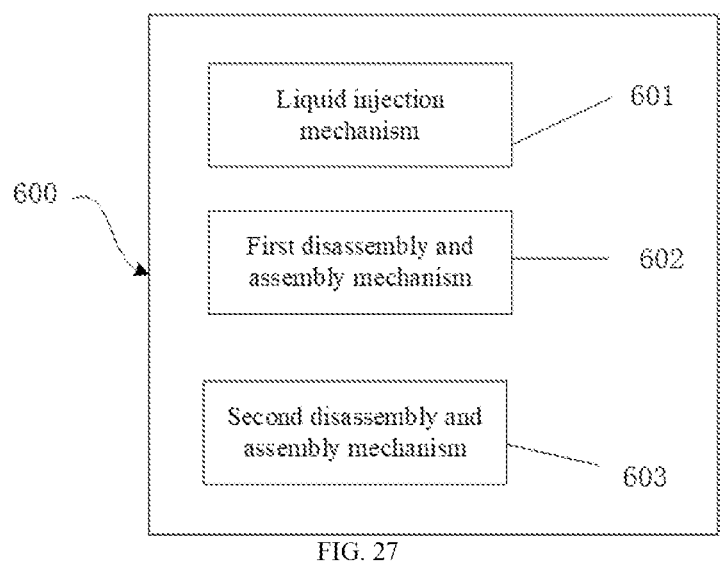
FIG. 27 is a schematic composition diagram of a liquid injection device in some embodiments of the present application.

Finally, the present application also provides a liquid injection device 600, which is used for liquid injection of the battery cell 400, and is used to implement the above liquid injection method. As shown in FIG. 27, in some embodiments, the liquid injection device 600 includes:

a liquid injection mechanism 601 configured to inject electrolyte into a shell 70 through a through hole 11 disposed in the shell 70; and a first disassembly and assembly mechanism 602 configured to rotate a pressure relief device 10b from a second position to a first position when the pressure relief device 10b is in the second position, so that a second clamping portion 42 of the pressure relief device 10b and a first clamping portion 24 on the shell 70 are changed from a disengaged state to a clamping state, so as to limit separation of the pressure relief device 10b from a housing 7 or an end cover 10a of the shell 70.

Compared with the traditional manner of sealing a liquid injection hole by laser welding, the present application can not only omit welding and sealing procedures of the liquid injection hole, but also omit many other procedures such as subsequent cleaning of welding slag caused by the welding and drying of cleaning residual liquid. The liquid injection device 600 can simply and efficiently produce the battery cell 400, thereby improving the production efficiency of the battery cell 40.

Continuing to refer to FIG. 27, in some embodiments, the first disassembly and assembly mechanism 602 is also configured to rotate the pressure relief device 10b from the first position to the second position, so that the second clamping portion 42 and the first clamping portion 24 are disengaged to facilitate the removal of the pressure relief device 10b from the shell 70.

In addition, referring to FIG. 27, in some embodiments, the liquid injection device 600 further includes a second disassembly and assembly mechanism 603, and the second disassembly and assembly mechanism 603 is configured to install the sealing ring 3 on the shell 70, or remove the sealing ring 3 from the shell 70. For example, after the pressure relief device 10b is detached from the shell 70, the sealing ring 3 is removed from the shell 70 by the second disassembly and assembly mechanism 603. Based on this, the disassembly and assembly of the sealing ring 3 can be conveniently realized during assembly, secondary liquid injection and other maintenance processes of the battery cell, thereby improving the disassembly and assembly efficiency, reducing pollution to the sealing ring 3, and prolonging the service life of the sealing ring 3.

The liquid injection device 600 provided by the present application can flexibly and conveniently assist in the disassembly and assembly of the pressure relief device 10b in maintenance processes such as production, assembly and secondary liquid injection of the battery cell. The operation is simple. It is beneficial to improve the assembly efficiency of the battery cell 400, and shorten the maintenance time required for the battery cell 400, so that liquid replenishment can be implemented in time when the performances decline, thereby ensuring the working performances of the battery cell 400.

The above various protection subject matters and the features in respective embodiments of the present application can refer to each other. If the structure allows, those skilled in the art can also flexibly combine the technical features in different embodiments to form more embodiments.

The foregoing describes an end cover assembly for a battery cell, a battery cell, and a device using the battery cell according to the present application in detail. Specific embodiments are used herein to describe the principles and implementations of the present application, and the description of the above embodiments is only used to help to understand the method and core ideas of the present application. It should be pointed out that for those of ordinary skill in the art, without departing from the principles of the present application, several improvements and modifications can be made to the present application, and these improvements and modifications also fall within the protection scope of claims of the present application.

The invention claimed is:

1. An end cover assembly for a battery cell, comprising:
an end cover provided with a through hole for electrolyte injection and a first clamping portion, wherein the first clamping portion is disposed along a circumferential direction of the through hole and located on one side of the end cover away from an interior of the battery cell;
a sealing ring for sealing the through hole; and
a pressure relief device covering at least part of the sealing ring and closing the through hole, wherein the pressure relief device is configured to be destroyed when an internal pressure of the battery cell reaches a threshold, so as to remove a closure of the through hole and release the internal pressure of the battery cell;

wherein the pressure relief device comprises a second clamping portion and is rotatable such that when the pressure relief device is rotated to a first position, the second clamping portion is clamped with the first clamping portion to limit separation of the pressure relief device from the end cover, and when the pressure relief device is rotated to a second position, the second clamping portion is disengaged from the first clamping portion to realize separation of the pressure relief device and the end cover, wherein the first clamping portion is one of a clamping slot and a clamping column, and the second clamping portion is the other of the clamping slot and the clamping column, and wherein in a height direction, the first clamping portion is not lower than a position of the sealing ring.

2. The end cover assembly according to claim 1, wherein the pressure relief device comprises a main body portion and a pressure relief member, the main body portion is connected to the second clamping portion, the pressure relief member closes the through hole, and the pressure relief member is configured to be destroyed when the internal pressure of the battery cell reaches the threshold to release the internal pressure.

3. The end cover assembly according to claim 2, wherein the pressure relief member and the main body portion are integrally or separately disposed.

4. The end cover assembly according to claim 3, wherein
the pressure relief member and the main body portion are disposed separately, and the pressure relief member is disposed between the main body portion and the sealing ring; and/or
the pressure relief member comprises a metal layer and a protective layer, the protective layer and the metal layer are disposed in a laminating manner, and an elongation rate of the protective layer is greater than an elongation rate of the metal layer.

5. The end cover assembly according to claim 4, wherein the pressure relief device further comprises a separation ring, the separation ring is disposed between the main body portion and the pressure relief member so as to separate the main body portion from the pressure relief member to protect the pressure relief member.

6. The end cover assembly according to claim 5, wherein the separation ring is attached to the pressure relief member.

7. The end cover assembly according to claim 3, wherein the pressure relief member is an aluminum plastic film.

8. The end cover assembly according to claim 2, wherein the pressure relief device comprises at least two pressure relief members connected to each other, such that when the internal pressure of the battery cell reaches the threshold, an interconnected part of the at least two pressure relief members is broken through to release the internal pressure.

9. The end cover assembly according to claim 8, wherein
the at least two pressure relief members are butted or partially overlap; and/or
the at least two pressure relief members are connected by means of heat sealing.

10. The end cover assembly according to claim 9, wherein the at least two pressure relief members partially overlap, and an overlapping part of the at least two pressure relief members protrudes to one side away from the sealing ring relative to remaining parts of the at least two pressure relief members.

11. The end cover assembly according to claim 10, wherein
the overlapping part of the at least two pressure relief members is bent to reduce a height of the overlapping part; and/or
a separation ring of the pressure relief device is provided with an accommodating slot, and the overlapping part of the at least two pressure relief members is accommodated in the accommodating slot.

12. The end cover assembly according to claim 1, wherein the pressure relief device is provided with a groove, and the sealing ring is located in the groove.

13. The end cover assembly according to claim 1, wherein the end cover assembly further comprises a guide slot, the guide slot is in communication with the clamping slot, such that during rotation of the pressure relief device, the clamping column enters and exits the clamping slot through the guide slot.

14. A battery cell, comprising:
an electrode assembly and a shell for accommodating the electrode assembly, wherein the shell comprises a housing and the end cover assembly according to claim 1, the housing has an end opening, and the end cover assembly covers the end opening of the housing.

15. A battery, comprising at least two battery cells according to claim 14.

16. An electric equipment, comprising the battery cell according to claim 14, wherein the battery cell is configured to provide electric energy.

* * * * *